United States Patent
Smith et al.

(10) Patent No.: US 9,168,874 B2
(45) Date of Patent: Oct. 27, 2015

(54) TRUCK STORAGE SYSTEM

(71) Applicant: DECKED LLC, Ketchum, ID (US)

(72) Inventors: Timothy Raymond Smith, Commerce Township, MI (US); Jake Peters, Ketchum, ID (US); Lance Meller, Ketchum, ID (US); Mike Hattrup, Ketchum, ID (US); Dylan Rothwell, Park City, UT (US); Shaun Christopher Muston, South Lyon, MI (US); Jeffrey Samuel Hopkins, Livonia, MI (US)

(73) Assignee: DECKED, LLC, Ketchum, ID (US)

( * ) Notice: Subject to any disclaimer, the term of this patent is extended or adjusted under 35 U.S.C. 154(b) by 206 days.

(21) Appl. No.: 13/932,600

(22) Filed: Jul. 1, 2013

(65) Prior Publication Data

US 2014/0284365 A1    Sep. 25, 2014

Related U.S. Application Data

(60) Provisional application No. 61/804,465, filed on Mar. 22, 2013.

(51) Int. Cl.
*B60R 9/00* (2006.01)
*B60R 7/02* (2006.01)

(52) U.S. Cl.
CPC .... *B60R 9/00* (2013.01); *B60R 7/02* (2013.01)

(58) Field of Classification Search
CPC .............. B60R 9/00; B60R 7/02; B60R 7/08; B60R 5/04; B60R 5/041; B60R 9/06
See application file for complete search history.

(56) References Cited

U.S. PATENT DOCUMENTS

| | | | | |
|---|---|---|---|---|
| 3,726,422 A | * | 4/1973 | Zelin | 414/522 |
| 3,891,262 A | * | 6/1975 | Brunel | 296/3 |
| 4,057,281 A | * | 11/1977 | Garrett | 296/3 |
| 4,138,046 A | * | 2/1979 | De Freze | 224/405 |
| 4,305,695 A | * | 12/1981 | Zachrich | 414/522 |
| 4,573,731 A | | 3/1986 | Knaack et al. | |
| 4,733,898 A | | 3/1988 | Williams | |
| 4,824,158 A | * | 4/1989 | Peters et al. | 296/37.6 |
| 4,993,088 A | * | 2/1991 | Chudik | 5/118 |
| 5,190,337 A | * | 3/1993 | McDaniel | 296/3 |
| 5,310,269 A | | 5/1994 | Wardle et al. | |
| 5,470,120 A | * | 11/1995 | Christensen | 296/3 |
| 5,509,709 A | * | 4/1996 | Carroll | 296/3 |
| D372,016 S | | 7/1996 | Wolford | |
| 5,603,439 A | * | 2/1997 | Pineda | 224/403 |
| 5,628,540 A | * | 5/1997 | James | 296/3 |
| 5,634,408 A | * | 6/1997 | Jarkowski | 108/44 |
| 5,964,492 A | * | 10/1999 | Lyon | 296/37.6 |
| 5,996,868 A | * | 12/1999 | Paradis | 224/404 |
| 6,003,924 A | | 12/1999 | Nicol et al. | |

(Continued)

*Primary Examiner* — Brian D Nash
(74) *Attorney, Agent, or Firm* — Kenyon & Kenyon LLP

(57) ABSTRACT

A truck storage system may include a deck configured to span substantially a total width of a truck bed, four support feet, each support foot situated at a respective corner of the truck bed and configured to support the deck, and a center support extending in a longitudinal direction of the truck bed between the support feet and configured to support the deck. Alternatively, the truck storage system may be configured to span approximately half a total width of a truck bed, and include two support feet situated in corners on a same lateral side of the truck bed, and a center support extending in a longitudinal direction of the truck bed between the support feet and an opposing side of the truck bed not spanned by the deck.

24 Claims, 28 Drawing Sheets

(56) References Cited

U.S. PATENT DOCUMENTS

| | | |
|---|---|---|
| D426,187 S | 6/2000 | Shultz |
| 6,287,005 B1 | 9/2001 | Teramachi |
| 6,318,781 B1 | 11/2001 | McKee |
| 6,394,326 B1 * | 5/2002 | Lanier ............... 224/405 |
| 6,629,714 B2 | 10/2003 | Campbell |
| 6,695,375 B1 | 2/2004 | May |
| 7,083,219 B1 | 8/2006 | Gregory |
| 7,270,360 B2 | 9/2007 | Frasure et al. |
| D577,328 S | 9/2008 | Vrbas |
| 7,419,203 B2 | 9/2008 | Chandler et al. |
| 7,530,618 B2 * | 5/2009 | Collins et al. ............ 296/37.6 |
| 8,162,367 B2 | 4/2012 | Kuklok |
| D659,074 S | 5/2012 | Read et al. |
| 8,210,591 B2 | 7/2012 | Martin |
| 8,240,527 B1 | 8/2012 | Casselton |
| 8,256,820 B2 | 9/2012 | Spencer |
| 8,262,159 B2 | 9/2012 | Daniels, Jr. |
| 8,281,967 B2 | 10/2012 | Evans |
| 8,393,665 B2 | 3/2013 | Villano et al. |
| 2002/0153397 A1 * | 10/2002 | Sutton ............... 224/405 |
| 2009/0096239 A1 * | 4/2009 | Martin ............... 296/37.6 |
| 2010/0072154 A1 * | 3/2010 | Johnson ............... 211/184 |
| 2013/0270854 A1 * | 10/2013 | Weller ............... 296/37.6 |

* cited by examiner

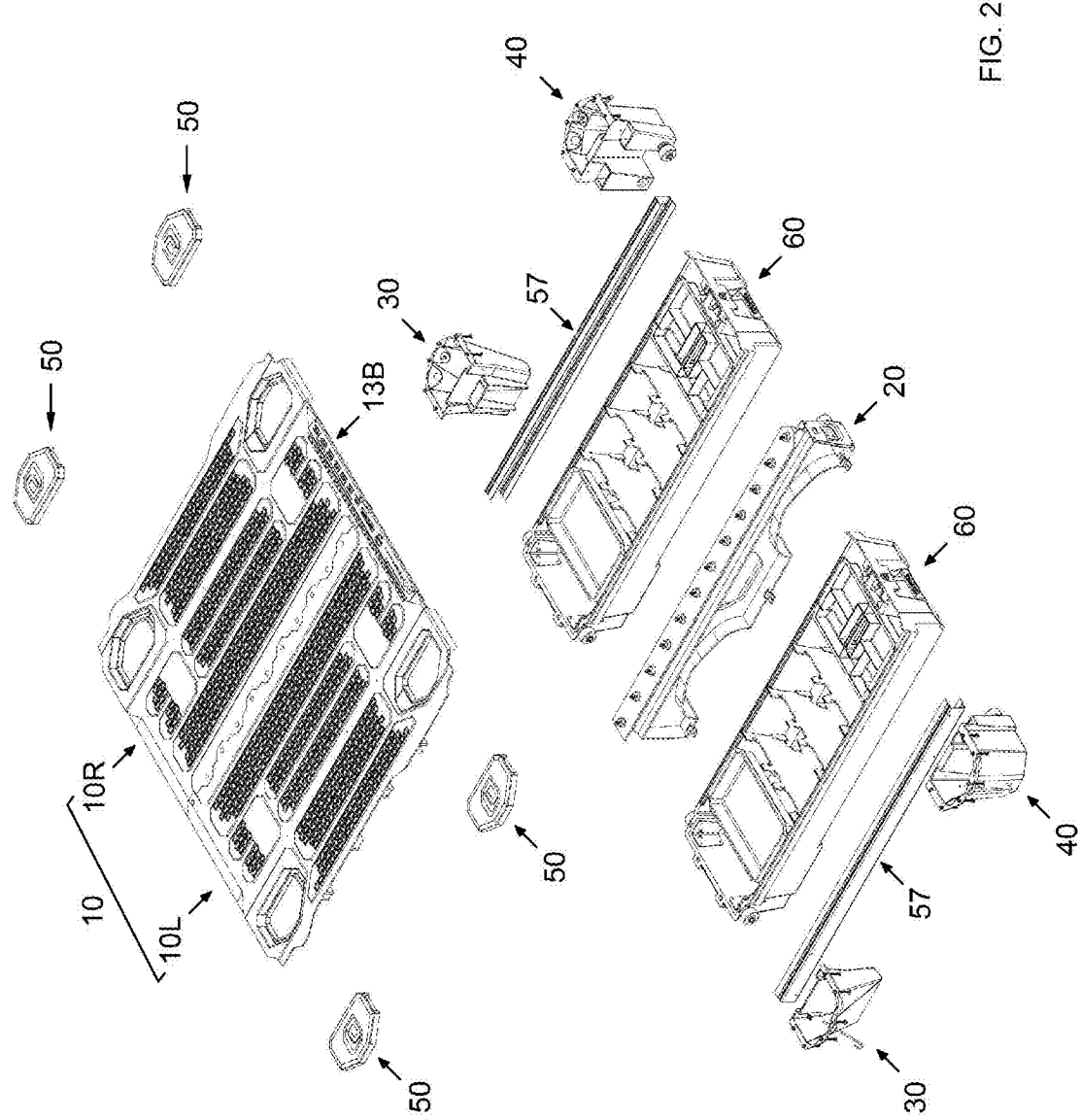

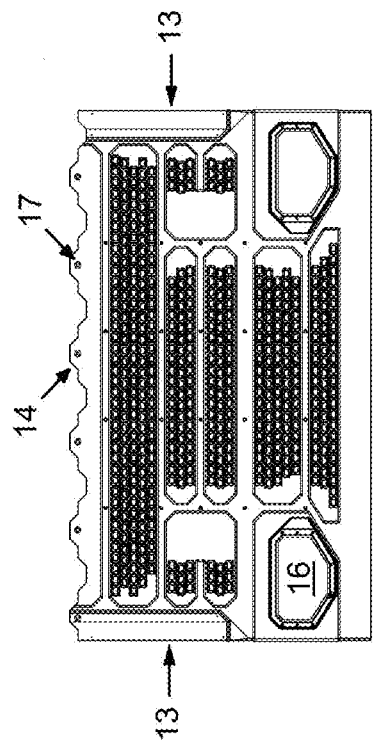
FIG. 3C
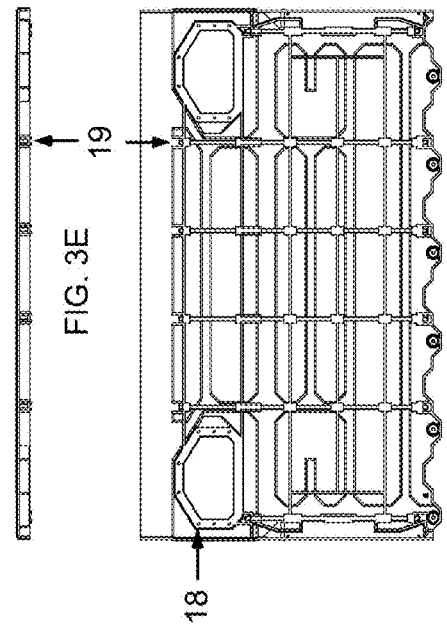
FIG. 3D
FIG. 3E
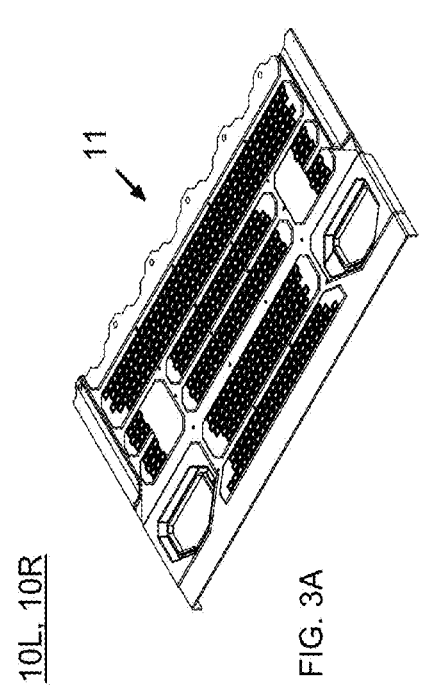
FIG. 3A
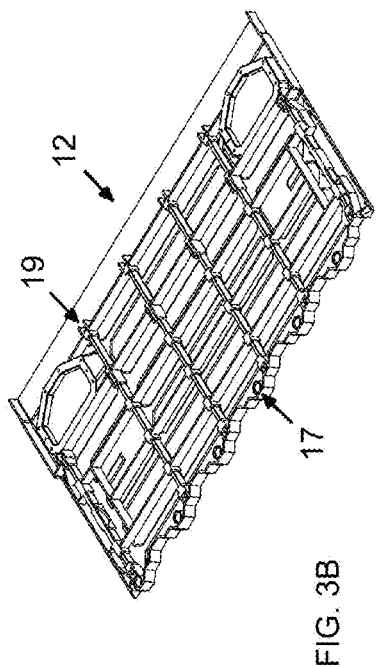
FIG. 3B

19

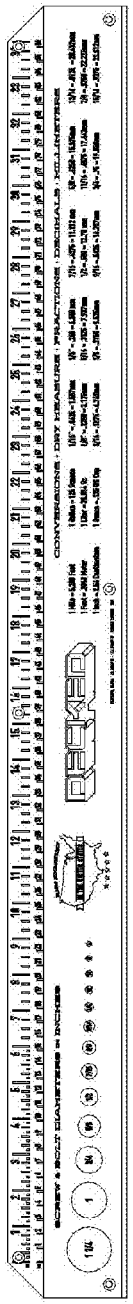
FIG. 5A
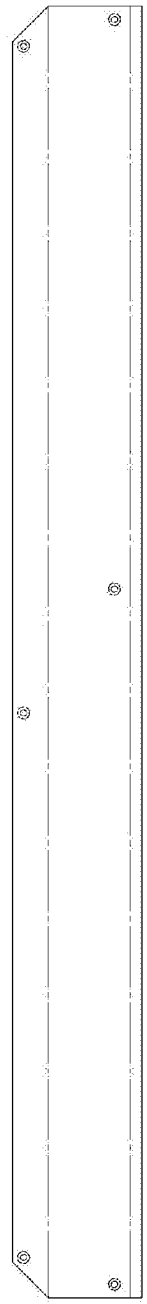
FIG. 5B
FIG. 5C

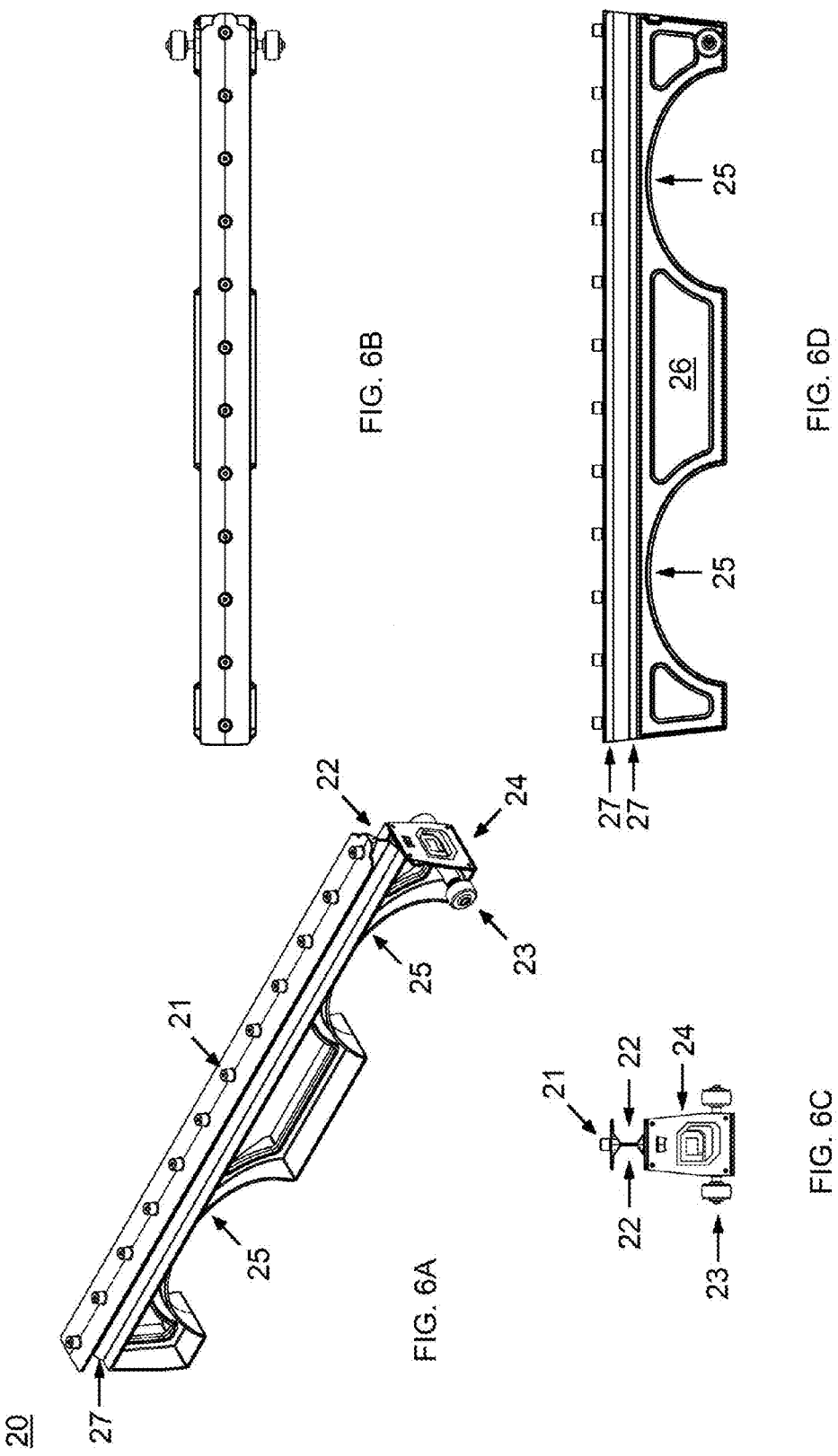

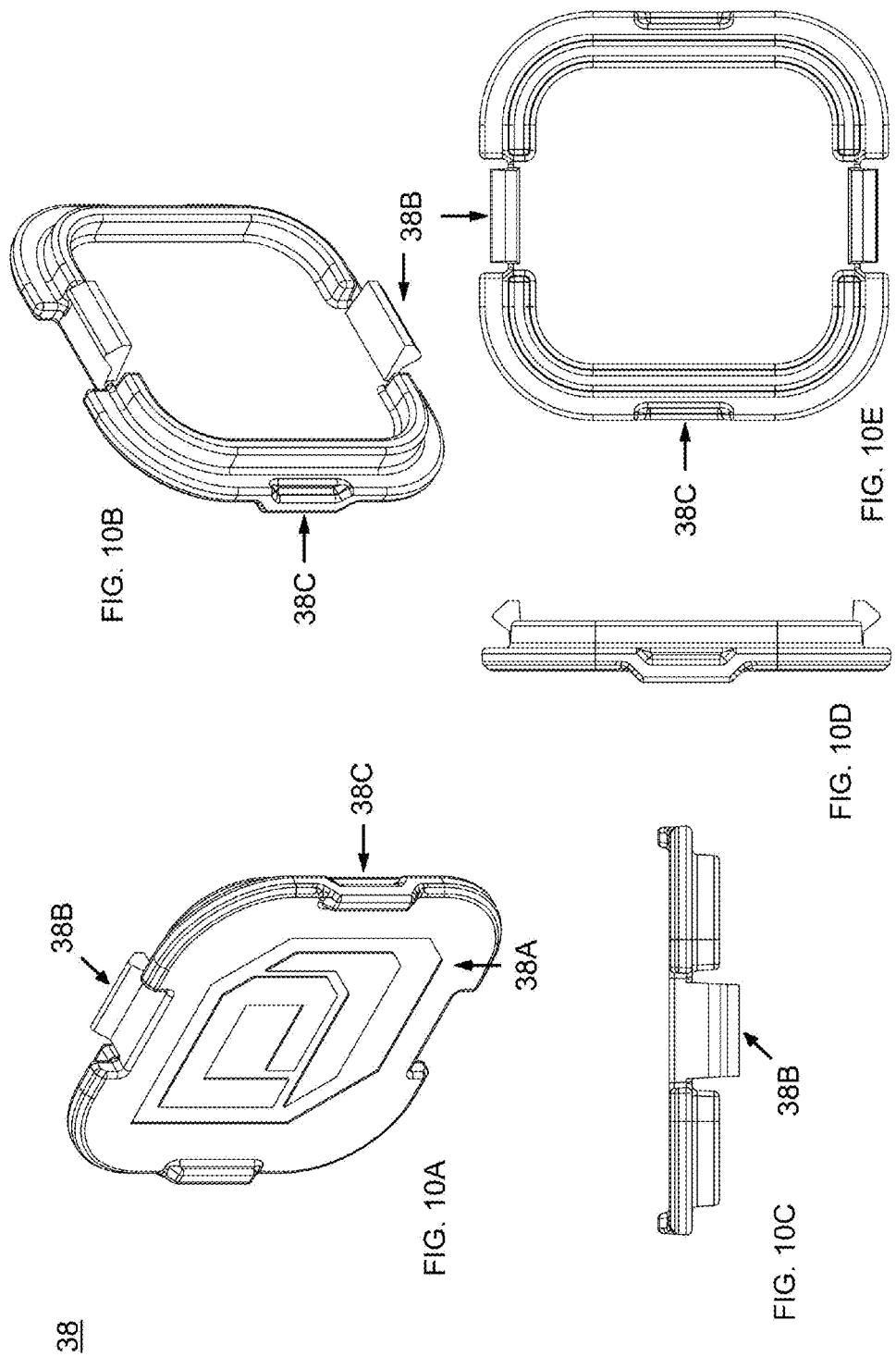

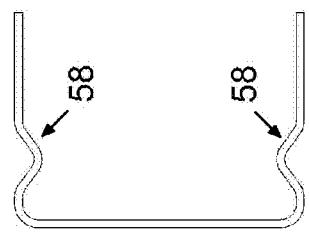
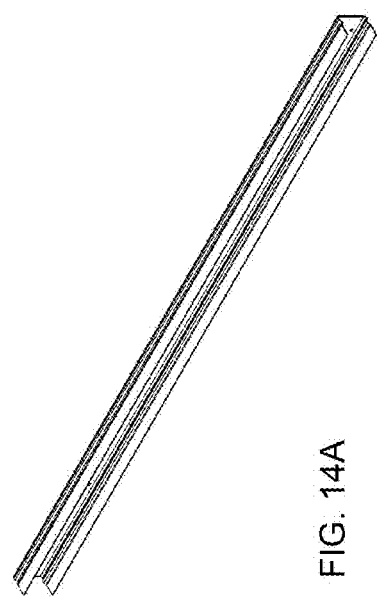
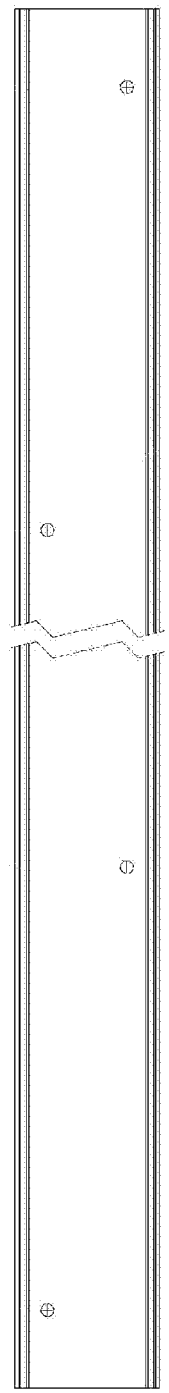
FIG. 14B
FIG. 14C
FIG. 14A

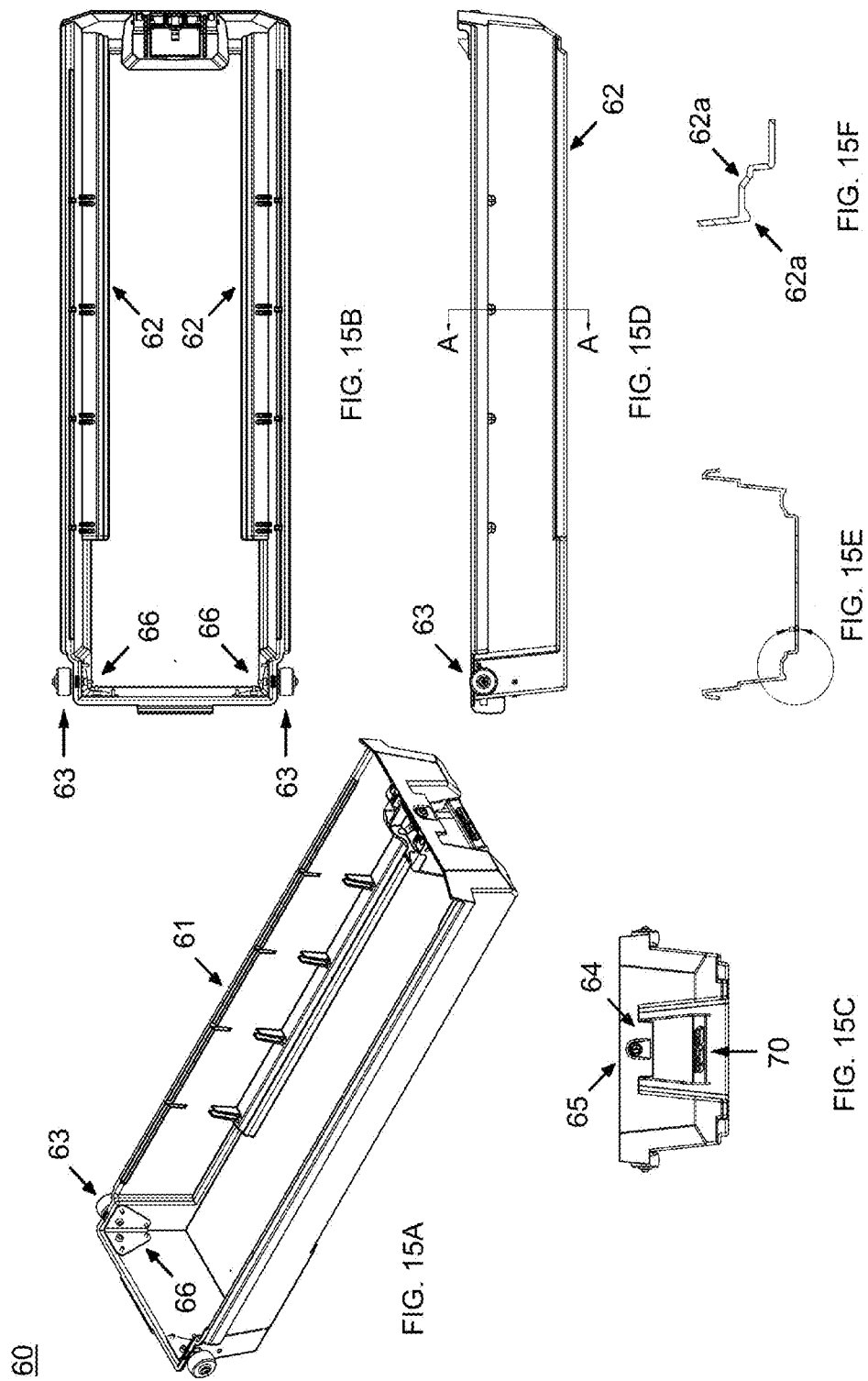

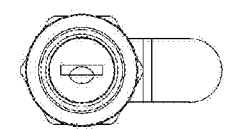
FIG. 16B
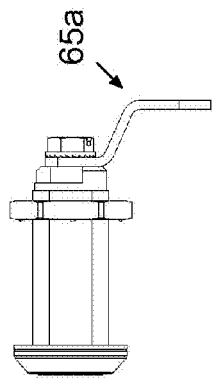
FIG. 16D
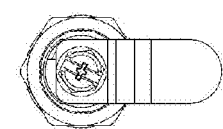
FIG. 16A
FIG. 16C

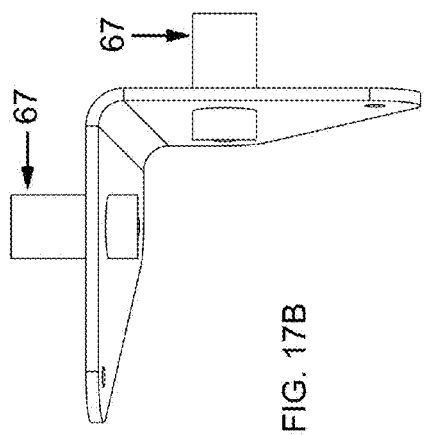
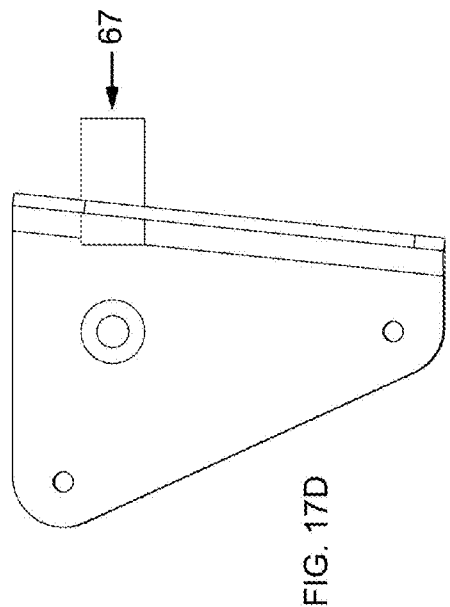
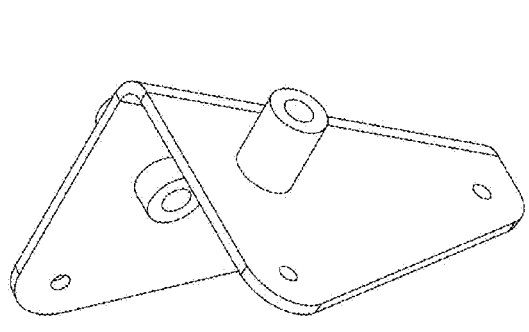
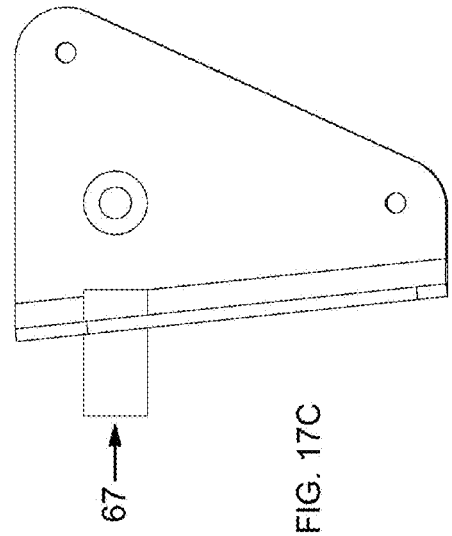

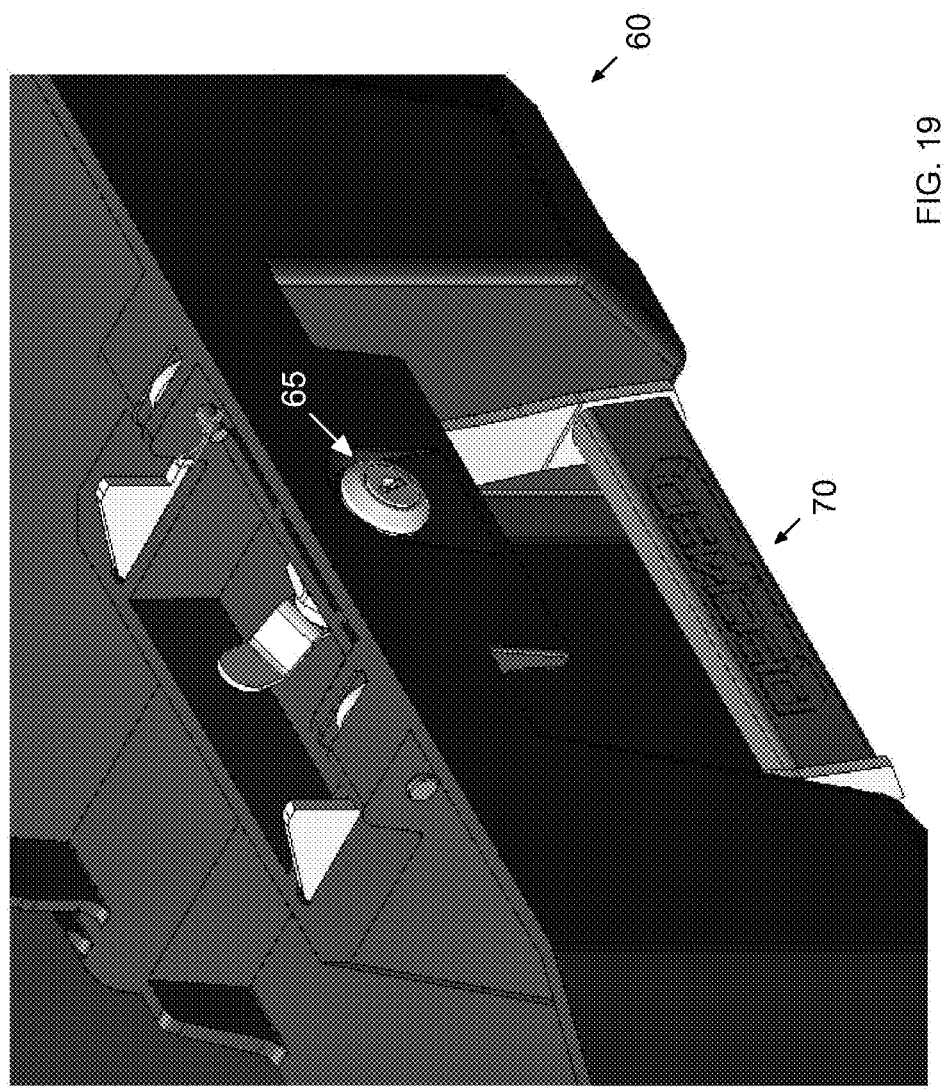

71

72

73

94

US 9,168,874 B2

TRUCK STORAGE SYSTEM

CROSS-REFERENCE TO RELATED APPLICATION

The present application claims priority to U.S. Provisional Patent Application No. 61/804,465, filed on Mar. 22, 2013, which is expressly incorporated herein in its entirety by reference thereto.

FIELD OF THE INVENTION

The present invention relates generally to a truck storage system, and a method of making such a truck storage system.

BACKGROUND INFORMATION

Existing truck storage systems generally comprise a box frame or cabinet structure having drawers that is placed within a truck bed and secured to the truck bed via brackets and holes drilled in the truck bed. Such storage systems generally do not extend the full width of the truck bed, thus not fully utilizing the available storage space, and the storage systems may create gaps and areas between the storage systems and the truck bed sidewalls in which various materials can become trapped and/or lost. Further, the loading and/or hauling of materials on top of the storage systems is rendered more difficult and less reliable by such gaps and areas between the storage systems and the truck bed sidewalls. In addition, the box frame or cabinet structure may not be designed to carry heavy loads that would be suitable for the truck bed alone, and/or the use of the drawers within the storage systems may be adversely affected by such heavy loads placed thereon. Moreover, storage systems that may be designed to carry heavy loads may add excessive weight to the truck bed, thereby adversely affecting vehicle performance, such as for example, handling, torque, speed, fuel economy, and others.

SUMMARY

In accordance with an exemplary embodiment of the present invention, a truck storage system may include a deck configured to span substantially a total width of a truck bed, four support feet, each support foot situated at a respective corner of the truck bed and configured to support the deck, and a center support extending in a longitudinal direction of the truck bed between the support feet and configured to support the deck.

The deck may include two, non-handed deck halves configured to interleave with each other above the center support. Outer lateral edges of the deck may be processable to match sidewall profiles of a plurality of different truck beds. In addition, the deck may include transverse reinforcement beams configured to increase strength of the deck. Further, the deck may be attached to upper surfaces of the four support feet by fasteners, and to an upper surface of the center support by protrusions and corresponding countersunk holes and/or fasteners.

The deck may include four openings, each opening leading to a compartment defined by an interior of each support foot, and non-handed covers may cover each of the four openings, an underside of each cover including cup holders, trays and/or compartments. A ruler plate may be situated at a rearward edge of the deck and configured to act as a scuff plate.

The four support feet may include two, non-handed front support feet and two, non-handed rear support feet. Each support foot may be attached to existing tie-down points of the truck bed via J-hooks, brackets and/or fasteners, and each support foot may be attachable to existing tie-down points of a plurality of different truck beds.

The center support may act as a load rest without direct attachment to the truck bed. The center support may stably support the deck in a plurality of different truck beds.

The deck, the support feet, and the center support may be made of high density polyethylene.

The truck storage system may also include at least one drawer assembly situated between a) a front support foot and a rear support foot on one side, and b) the center support on an other side, the drawer assembly configured to be slidable in the longitudinal direction of the truck bed via wheels and corresponding self-centering guide channels. The center support may include an integral, inner guide channel to receive an inner front wheel of the drawer assembly, an outer guide channel may extend in the longitudinal direction of the truck bed between the front support foot and the rear support foot and receive an outer front wheel of the drawer assembly, the center support may include an inner rear wheel, the rear support foot may include an outer rear wheel, and the drawer assembly may include integral, lower guide channels to receive each of the inner and outer rear wheels.

The drawer assembly may include a latch and a lock configured to interengage with a reinforcement beam on an underside of the deck. In addition, the drawer assembly may include a notch, a raised surface and/or a sloped surface on its rearward, lower surface configured to provide clearance to a lowered tailgate of the truck bed. The drawer assembly may include at least two drawer assemblies that are nestable for packaging, shipping and/or storage. Further, the drawer assembly may include integral drawer stops configured to prevent falling out of the drawer assembly from the truck storage system.

The truck storage system may be manufacturable in long and short versions using a single set of tooling and tool inserts.

In accordance with a second exemplary embodiment of the present invention, the truck storage system may include a deck configured to span approximately half a total width of a truck bed, two support feet on a same lateral side of the truck bed, a front support foot situated at a forward corner of the truck bed and a rear support foot situated at a rearward corner of the truck bed, the two support feet configured to support the deck, and a center support extending in a longitudinal direction of the truck bed between the support feet and an opposing side of the truck bed not spanned by the deck, the center support configured to support the deck.

The second exemplary embodiment of the truck storage system may also include a trim piece configured to interleave with an edge of the deck above the center support, and to attach to an upper surface of the center support by protrusions and corresponding countersunk holes and/or fasteners. In addition, the second exemplary embodiment of the truck storage system may include brackets configured to secure the center support to the truck bed via fasteners, for example.

Example embodiments of the present invention are described in more detail below with reference to the appended Figures.

BRIEF DESCRIPTION OF THE DRAWINGS

FIG. 2 shows a partially exploded view of the first exemplary embodiment of a truck storage system according to the present invention.

FIGS. 3A to 3E show top perspective, bottom perspective, top, bottom and lateral side views, respectively, of a left deck half or a right deck half of a truck storage system according to the present invention.

FIGS. 5A to 5C show top, bottom and right side views, respectively, of a ruler plate of a truck storage system according to the present invention.

FIGS. 6A to 6D show top perspective, top, rear and left side views, respectively, of a center support assembly of a truck storage system according to the present invention.

FIGS. 10A to 10E show two perspective, two side and plan views, respectively, of an access hole cover for a front support foot of a truck storage system according to the present invention.

FIGS. 14A to 14C show top perspective, front/rear and lateral side views, respectively, of a guide channel of a truck storage system according to the present invention.

FIGS. 15A to 15F show top perspective, top, rear, lateral side, cross-sectional and close-up cross-sectional views, respectively, of a drawer assembly of a truck storage system according to the present invention. FIG. 15E is a cross-sectional view along line A-A shown in FIG. 15D, and FIG. 15F is a close-up cross-sectional view of the circled portion shown in FIG. 15E.

FIGS. 16A to 16D show top perspective, rear, front and lateral side views, respectively, of a lock of a truck storage system according to the present invention.

FIGS. 17A to 17D show top perspective, top, left side rear and right side rear views, respectively, of a drawer wheel bracket assembly of a truck storage system according to the present invention.

FIG. 19 shows a close-up, top perspective view of a latch assembly and lock of a truck storage system according to the present invention.

DETAILED DESCRIPTION

Figure 1:
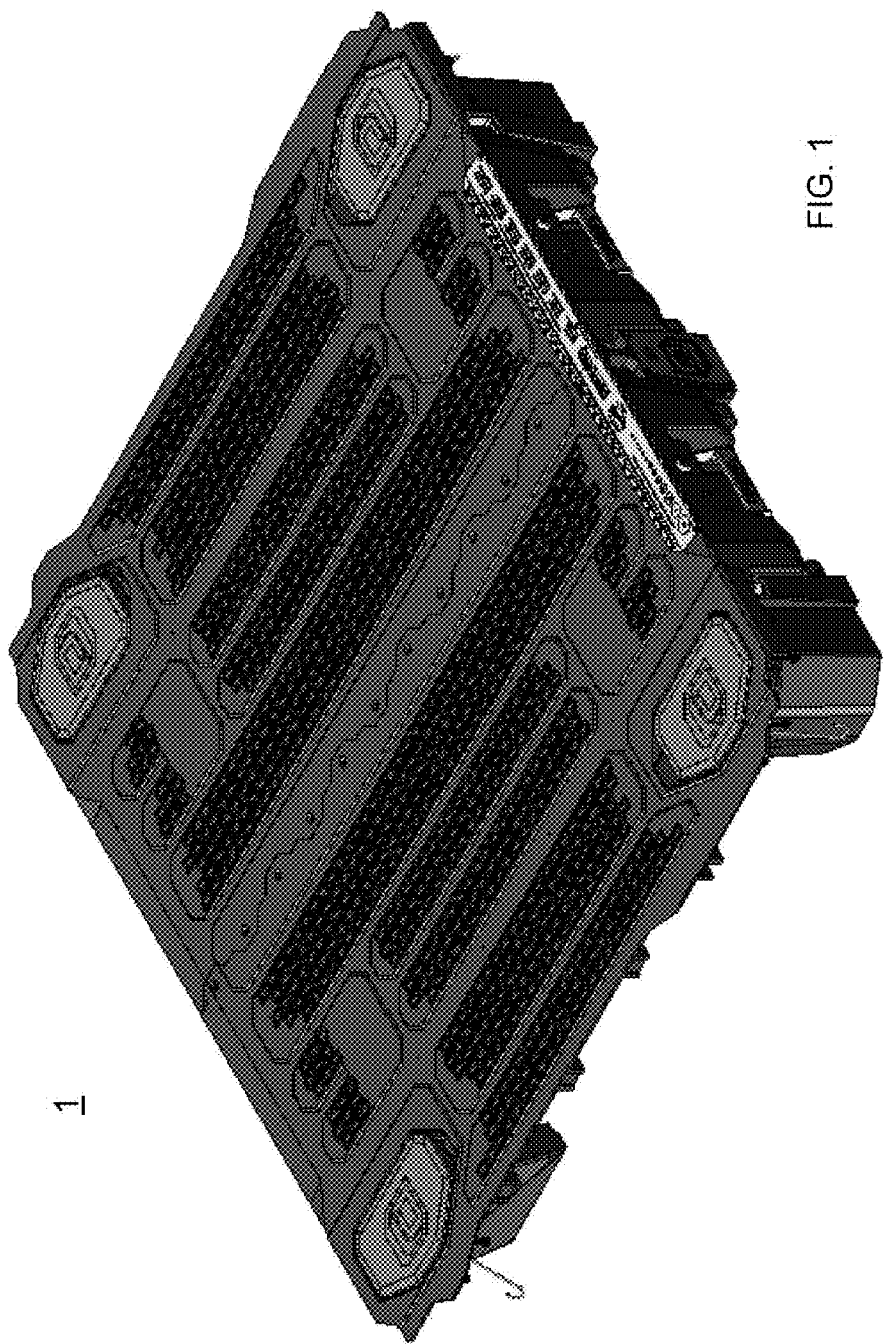
FIG. 1 shows a top perspective view of a first exemplary embodiment of a truck storage system according to the present invention.
Figure 4A:
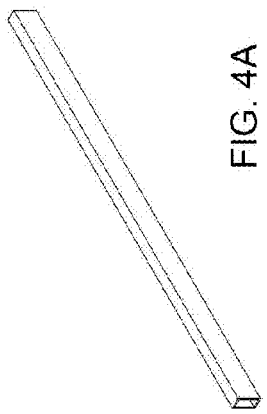
FIGS. 4A to 4D show top perspective, top, rear and side views, respectively, of a reinforcement beam of a truck storage system according to the present invention.
Figure 4B:
Figure 4C:
Figure 4D:
Figure 25:
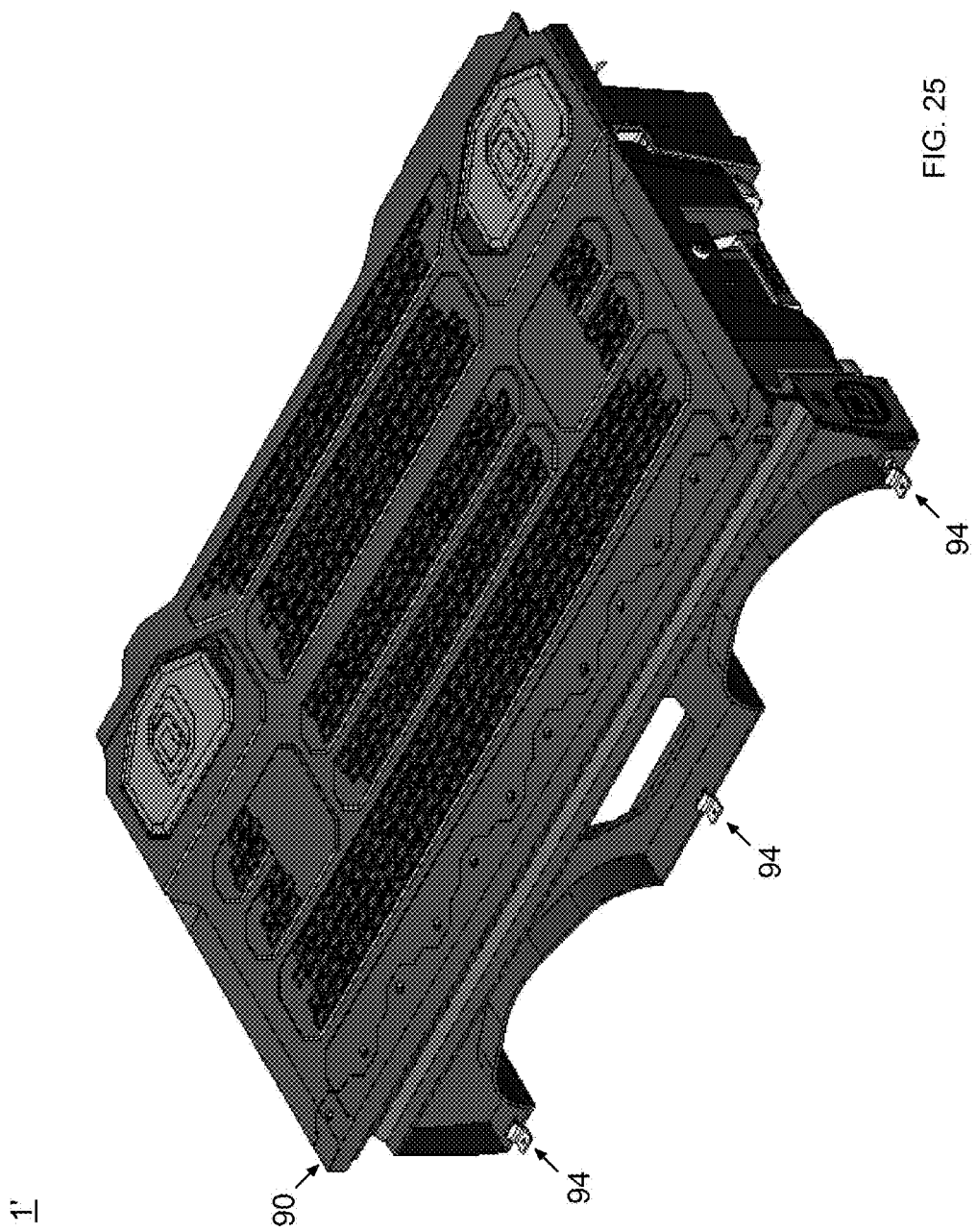
FIG. 25 shows a top perspective view of a second exemplary embodiment of a truck storage system according to the present invention.

FIG. 1 shows a top perspective view and FIG. 2 shows a partially exploded view of a first exemplary embodiment of a truck storage system 1 according to the present invention. As shown in FIGS. 1 and 2, the truck storage system 1 may comprise a deck 10 including a left deck half 10L and a right deck half 10R, a center support assembly 20, front support feet 30, rear support feet 40, foot support covers 50 and drawer assemblies 60, all of which will be described further herein. The truck storage system 1 may be sized to fit both long and short truck beds, and may cover substantially the full width of the truck bed, as shown in FIG. 1, for example, or only approximately half the width of the truck bed, as shown in FIG. 25, for example.

As used herein, the terms "front," "rear," "left side," and "right side" refer to directions with reference to a vehicle, e.g., a pickup truck, in which the truck storage system may be installed. For example, the term "front" refers to a forward-moving direction of the vehicle, the term "rear" refers to a rearward-moving direction of the vehicle, the term "left side" refers to a driver side of the vehicle (as commonly used in the U.S.), and the term "right side" refers to a passenger side of the vehicle (as commonly used in the U.S.).

FIGS. 3A to 3E show various views of a left deck half 10L or a right deck half 10R of a truck storage system 1 according to the present invention.

The left and right deck halves 10L, 10R may include an upper surface 11, a lower surface 12, front and rear edges 13, inner side edge 14, and lateral side edge 15. The deck halves 10L, 10R may be made of high density polyethylene, other plastics, metals, or combinations thereof, for example. The upper surface 11 may include various functional and/or decorative indicia or surface treatments, such as, for example, embossing, debossing, texturing (e.g., graining), engraving, printing, etc. For example, the surface treatment of the upper surface 11 may provide traction to prevent slipping and/or sliding of materials placed on the upper surface 11. As shown in FIGS. 1 to 3A and 3C, the upper surface 11 of the deck halves 10L, 10R may simulate a tire tread. Additionally, the upper surface 11 may include mounts, tracks, guides or rails for securing materials placed on the upper surface 11.

The deck halves 10L, 10R may include a plurality of reinforcement beams 19, as shown in FIGS. 3B, 3D, 3E, and 4A to 4D, for example, that traverse the deck halves 10L, 10R transversely from the inner side edge 14 to the lateral side edge 15. The reinforcement beams 19 may be made of high density polyethylene, other plastics, metals, or combinations thereof, for example. The reinforcement beams 19 may be completely encased within the deck halves 10L, 10R, or portions of the reinforcement beams 19 may remain exposed. For example, the reinforcement beams 19 may be at least partially exposed on the lower surface 12 of the deck halves 10L, 10R. Further, the reinforcement beams 19 may at least partially protrude from the lower surface 12 of the deck halves 10L, 10R. Alternatively or additionally, the reinforcement beams 19 may traverse the deck halves 10L, 10R in directions other than transversely from the inner side edge 14 to the lateral side edge 15. The reinforcement beams 19 may have varying lengths depending on their positions within the deck halves 10L, 10R. Although shown with a rectangular cross-section in FIGS. 4A to 4D, the reinforcement beams 19 may include other cross-sectional shapes that provide sufficient stiffness and support for the deck halves 10L, 10R and materials loaded thereon.

The front and rear edges 13 of the deck halves 10L, 10R may be configured to receive a ruler plate 13B, as shown in FIGS. 1, 2, and 5A to 5C, for example. For example, the ruler plate 13B may be attached to the deck halves 10L, 10R by fasteners and/or adhesives. The ruler plate 13B may be made of high density polyethylene, other plastics, metals, or combinations thereof, for example. The ruler plate 13B may include measurement indicia, conversion data and other information, for example, and may be replaceable with various designs of the ruler plate 13B. In addition, the ruler plate 13B may act as a scuff plate to protect the rearward edge of the deck halves 10L, 10R during use, such as during loading/unloading of materials from the rear of the truck bed.

The inner side edges 14 of the deck halves 10L, 10R may include a meandering profile that is identical for each deck half 10L, 10R, and is configured such that each of the left and right deck halves 10L, 10R may be made, at least initially, in the same shape and/or by using a single mold, i.e., non-handed deck halves. That is, the right deck half 10R is rotated 180 degrees from a position of the left deck half 10L, such that the inner side edges 14 of the deck halves 10L, 10R mate without gaps, thereby forming the deck 10.

Figure 7:
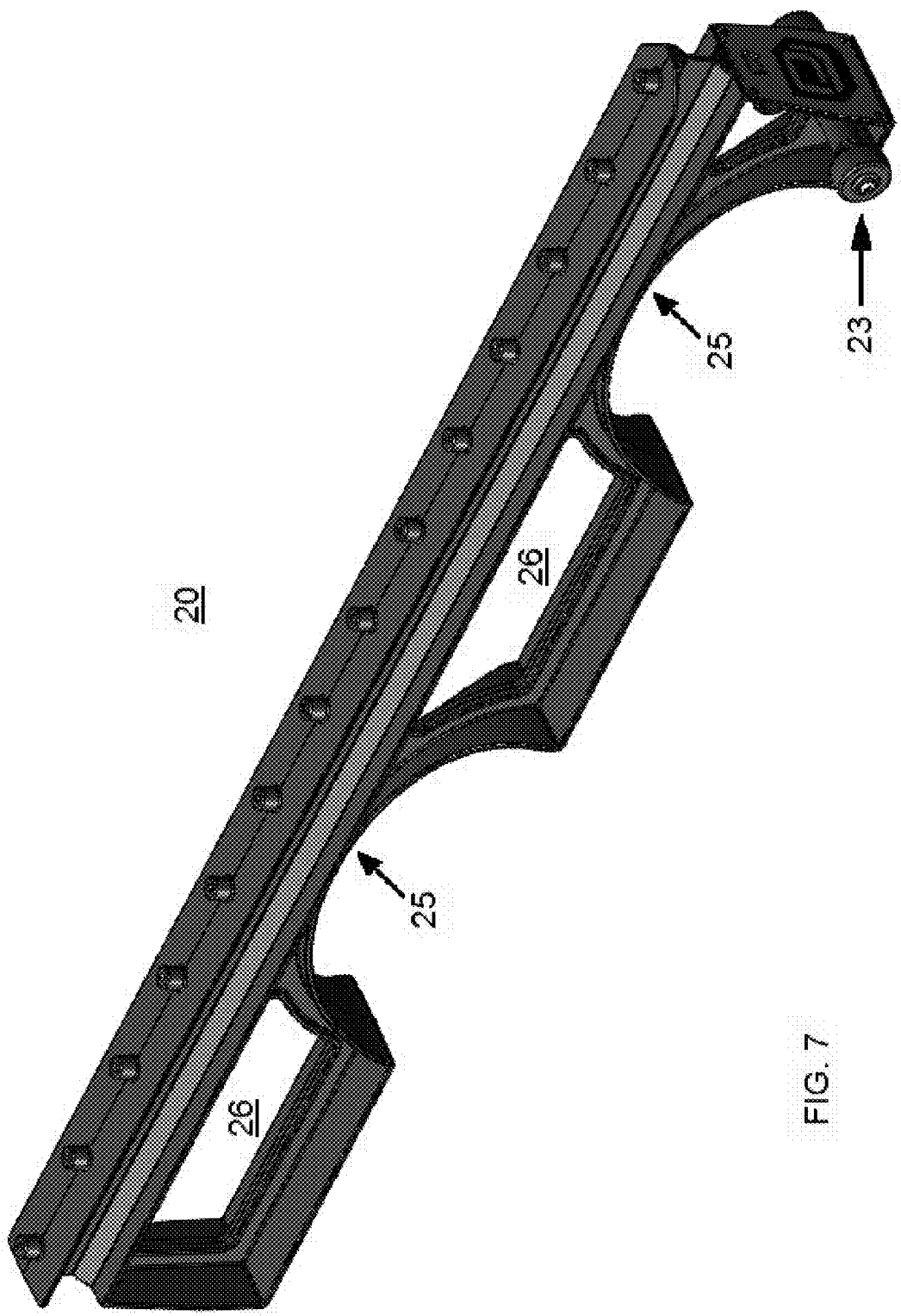
FIG. 7 shows a top perspective view of another exemplary embodiment of a center support assembly of a truck storage system according to the present invention.

The inner side edges 14 of the deck halves 10L, 10R may also include holes 17 for receiving projections 21 of a center support assembly 20, as shown in FIGS. 6A to 7, for example. The holes 17 may be countersunk on the lower surface 12 of the deck halves 10L, 10R in order to receive the projections 21 of the center support assembly 20. Additionally, fasteners or adhesives may be inserted in the holes 17 to secure the deck halves 10L, 10R to the center support assembly 20. In addition, the interface of the inner side edges 14 of the deck halves 10L, 10R may be configured to prevent the ingress of water and/or divert such water away from the drawer assemblies 60 and down toward the truck bed.

The lateral side edges 15 of the deck halves 10L, 10R may be processed to match the sidewall profiles of the truck bed in which the truck storage system 1 is to be installed. For example, the lateral side edges 15 of each deck half 10L, 10R may be cut, machined, laser cut, waterjet cut, or otherwise modified to precisely match the sidewall profiles of the truck bed, which sidewall profiles differ between various truck manufacturers and models, and may also differ between left and right sides on a single truck model.

The deck halves 10L, 10R may also include foot openings 16 that mate with the front and rear support feet 30, 40, as shown in FIGS. 9A to 9D and 11A to 11D, for example. Around the periphery of each foot opening 16 are provided holes 18 for attachment between the deck halves 10L, 10R and the front and rear support feet 30, 40. For example, fasteners and/or adhesives may be inserted in the holes 18 to secure the deck halves 10L, 10R to the front and rear support feet 30, 40.

FIGS. 6A to 7 show various views of a center support assembly 20 of a truck storage system 1 according to the present invention. The center support assembly 20 may be made of high density polyethylene, other plastics, metals, or combinations thereof, for example. As described, the center support assembly 20 may include projections 21 to mate with the holes 17 on the lower surface 12 of the deck halves 10L, 10R. In addition, the center support assembly 20 may include integral drawer wheel channels 22 for guiding wheels 63 provided on a drawer assembly 60, as well as wheels 23, to facilitate sliding of the drawer assemblies 60, as shown in FIGS. 15A to 15F, for example. The integral drawer wheel channels 22 may include at least one self-centering formation 27 that is configured to maintain wheels 63 provided on a drawer assembly 60 that roll within the integral drawer wheel channels 22 in an optimal position, e.g., both vertical position, as well as horizontal or lateral position, for smoothly opening/closing a drawer assembly 60. Furthermore, as shown in FIGS. 6A to 7, the center support assembly 20 may also include arches 25 and weight reduction holes 26 to simultaneously reduce weight of the center support assembly 20 while maintaining the strength of the truck storage system 1 to support the weight of materials placed thereon.

The center support assembly 20 may be configured as a load rest on the truck bed, such that no physical interconnections or attachments exist between the truck bed and the center support assembly 20. That is, the center support assembly 20 may simply rest on the truck bed due to gravity and/or the weight of any materials placed on the deck 10. Accordingly, the center support assembly 20 may be installed in the truck bed without requiring structural modification of the truck bed, such as for example, drilling holes in or bending/deforming the truck bed.

Figure 8C:
FIGS. 8A to 8C show top perspective, rear and side views, respectively, of a cover plate of a truck storage system according to the present invention.
Figure 8B:
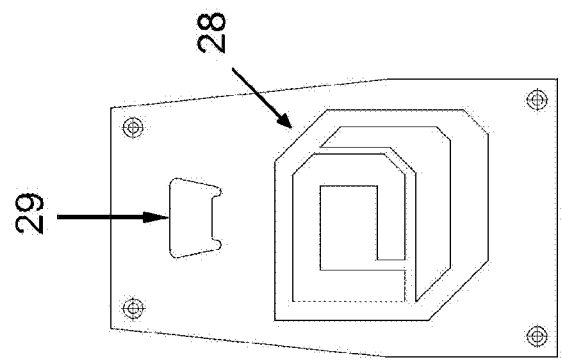
Figure 8A:
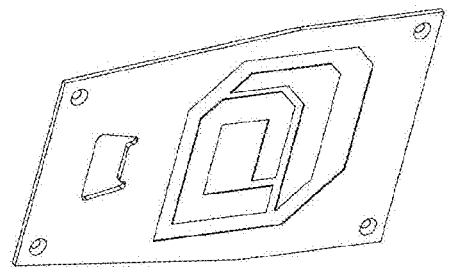
Figure 9B:
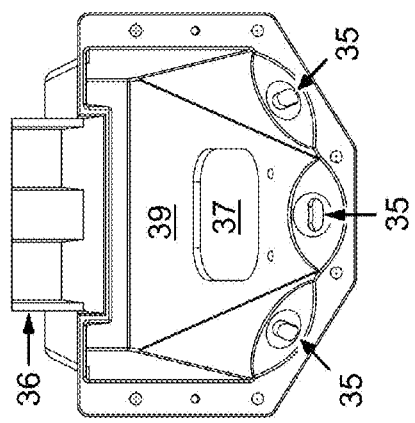
FIGS. 9A to 9D show top perspective, top, front/rear and lateral side views, respectively, of a front support foot of a truck storage system according to the present invention.
Figure 9D:
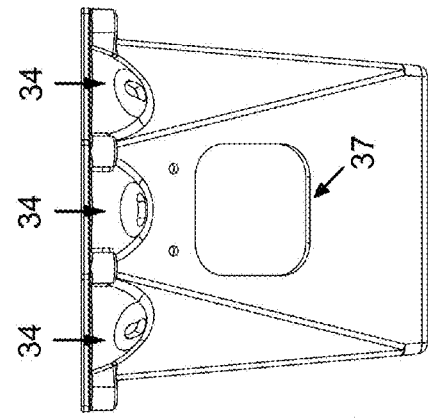
Figure 9A:
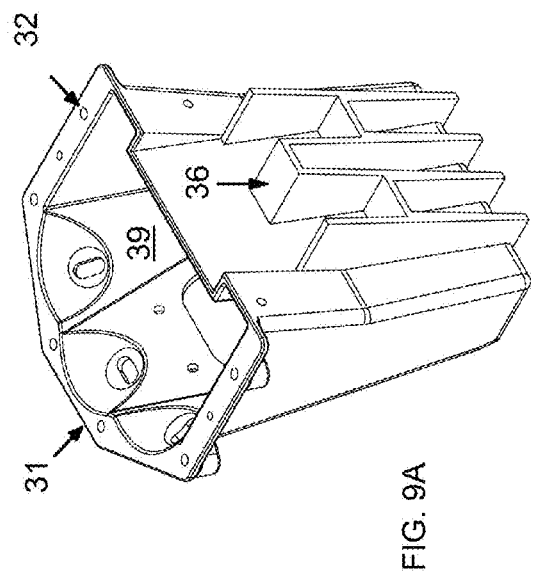
Figure 9C:
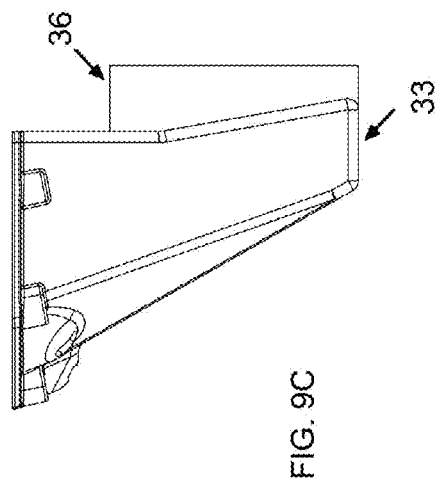
Figure 11B:
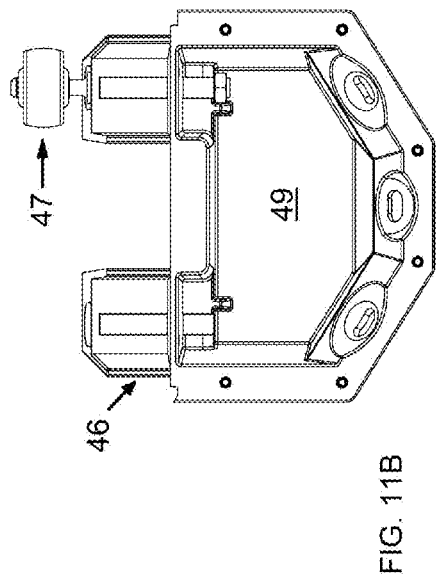
FIGS. 11A to 11D show top perspective, top, front/rear and lateral side views, respectively, of a rear support foot assembly of a truck storage system according to the present invention.
Figure 11D:
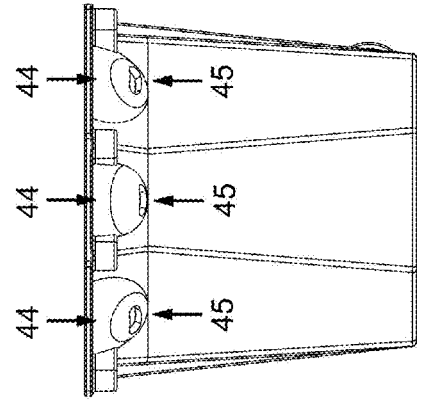
Figure 11A:
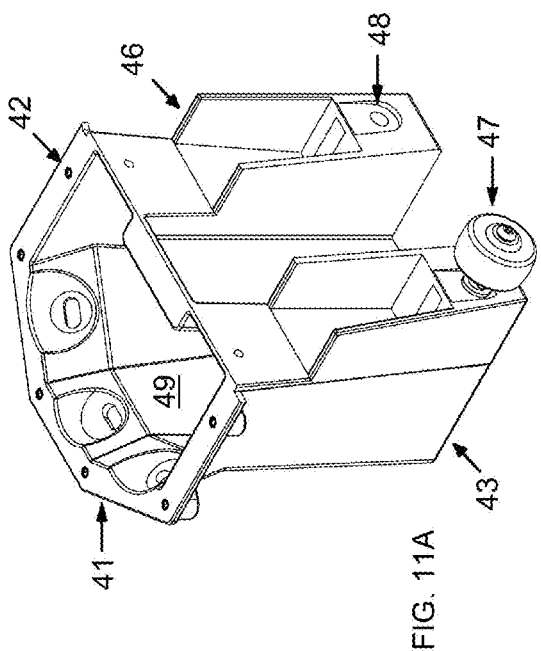
Figure 11C:
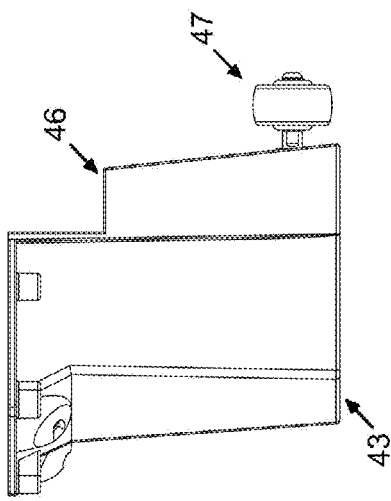
Figure 12E:
FIGS. 12A to 12F show top perspective, bottom perspective, top, bottom, front/rear and lateral side views, respectively, of a front/rear support foot cover of a truck storage system according to the present invention.
Figure 12F:
Figure 12C:
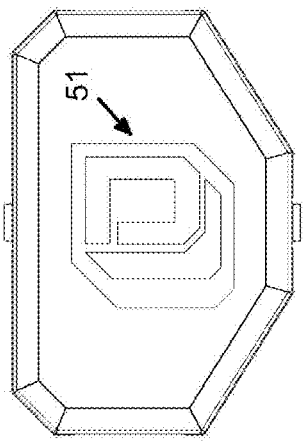
Figure 12D:
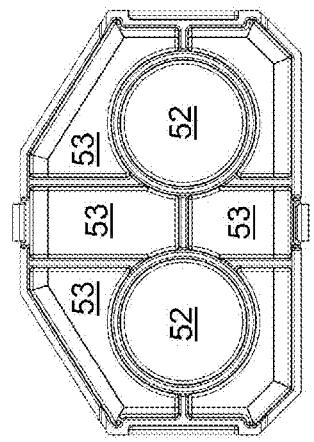
Figure 12A:
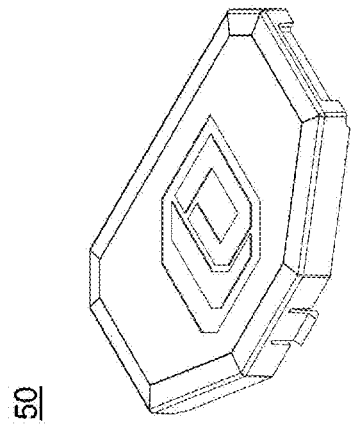
Figure 12B:
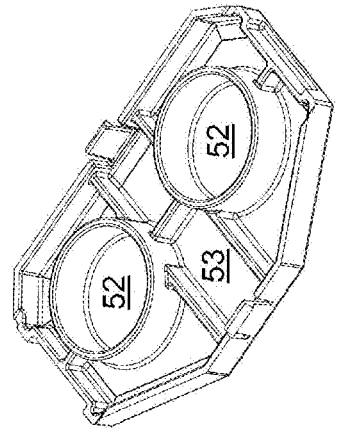

Further, the center support assembly 20 may also include a cover plate 24, as shown in FIGS. 8A to 8C, for example. The cover plate 24 may be made of high density polyethylene, other plastics, metals, or combinations thereof, for example. The cover plate 24 may include decorative indicia 28 or other surface treatment formed by, for example, embossing, debossing, texturing (e.g., graining), engraving, printing, etc. In addition, the cover plate 24 may include a bottle opener 29. For example, the cover plate 24 may be attached to the center support assembly 20 by fasteners and/or adhesives.

FIGS. 9A to 9D and 11A to 11D show various views of a front support foot 30 and a rear support foot assembly 40 of a truck storage system according to the present invention.

One front support foot 30 may be configured to be attached to the deck halves 10L, 10R in each of the front, driver side corner and the front, passenger side corner of the truck storage system 1, and one rear support foot assembly 40 may be configured to be attached to the deck halves 10L, 10R in each of the rear, driver side corner and the rear, passenger side corner of the truck storage system 1, as shown in FIG. 2, for example. The front and rear support feet 30, 40 may be made of high density polyethylene, other plastics, metals, or combinations thereof, for example. The front and rear support feet 30, 40 may include an upper surface 31, 41 having holes 32, 42 that align with holes 18 of each foot opening 16 for attachment between the deck halves 10L, 10R and the front and rear support feet 30, 40. For example, fasteners and/or adhesives may be inserted through holes 32, 42, 18 to secure the deck halves 10L, 10R to the front and rear support feet 30, 40. The front and rear support feet 30, 40 may also include a lower surface 33, 43 that rests on the truck bed. Between the upper surface 31, 41 and lower surface 33, 43, the front and rear support feet 30, 40 may define a compartment 39, 49 in which beverages, tools, fasteners or any other items may be placed. Further, the upper surface 31, 41 may include drain holes (not shown), e.g., forward and rearward drain holes, to direct water or other substances away from the compartment 39, 49 and down toward the truck bed.

Figure 13:
FIG. 13 shows a top perspective of a J-hook assembly of a truck storage system according to the present invention.
Figure 18B:
FIGS. 18A to 18D show top perspective, top, front/rear and lateral side views, respectively, of a drawer divider of a truck storage system according to the present invention.
Figure 18D:
Figure 18A:
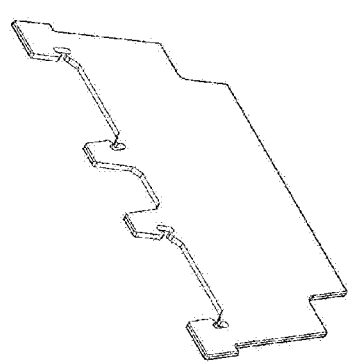
Figure 18C:
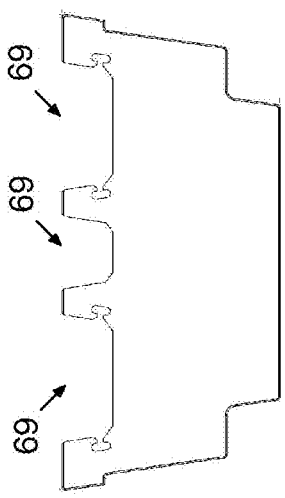
Figure 20C:
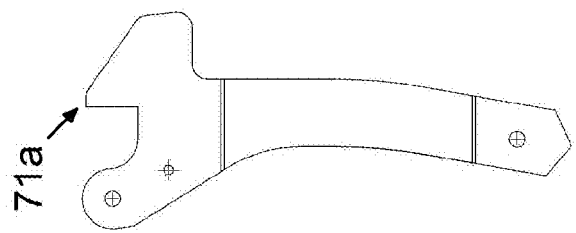
FIGS. 20A to 20C show perspective, rear and lateral side views, respectively, of a left arm of a latch assembly of a truck storage system according to the present invention.
Figure 20B:
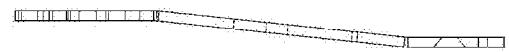
Figure 20A:
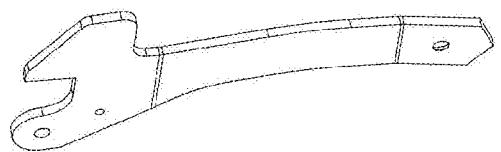
Figure 21C:
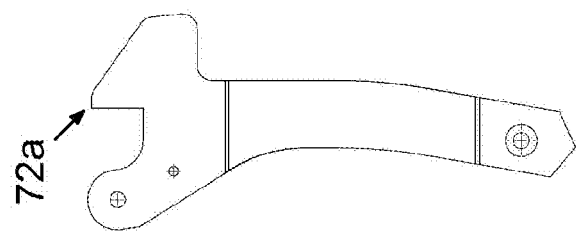
FIGS. 21A to 21C show perspective, rear and lateral side views, respectively, of a right arm of a latch assembly of a truck storage system according to the present invention.
Figure 21B:
Figure 21A:
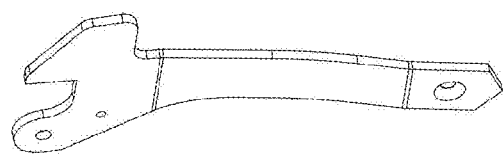
Figure 22C:
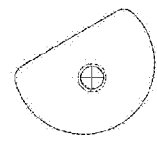
FIGS. 22A to 22C show top perspective, rear and lateral side views, respectively, of a handle of a latch assembly of a truck storage system according to the present invention.
Figure 22B:
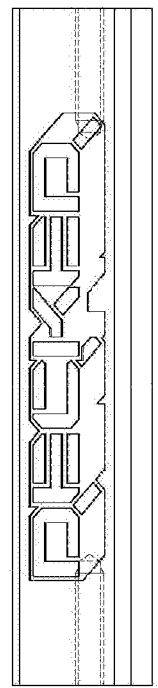
Figure 22A:
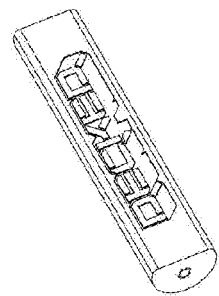

In addition, the front and rear support feet 30, 40 may include substantially spherical, semispherical or rounded attachment points 34, 44, and each attachment point 34, 44 may include a hole 35, 45. The holes 35, 45 are shown as elongated slots, but may also have other shapes, including circular or polygonal, for example. The attachment points 34, 44 may be used to secure the front and rear support feet 30, 40 to the truck bed via fasteners, brackets, hooks, etc. Preferably, the attachment points 34, 44 of the front and rear support feet 30, 40 may be secured to existing brackets, holes or tie-down points in the truck bed via a J-hook assembly 54, as shown in FIG. 13, for example. The J-hook assembly 54 may be made of high density polyethylene, other plastics, metals, or combinations thereof, for example. The J-hook assembly 54 includes a J-hook 55, a substantially spherical, semispherical or rounded washer 56, and a locking nut 56a threaded onto the J-hook 55. The substantially spherical, semispherical or rounded surface of the washer 56 is configured to mate with the substantially spherical, semispherical or rounded attachment points 34, 44 of the front and rear support feet 30, 40 in order to secure the J-hook assembly 54 at variously placed existing brackets, holes or tie-down points of the truck bed. Accordingly, the front and rear support feet 30, 40 may be installed in the truck bed without requiring structural modification of the truck bed, such as for example, drilling holes in or bending/deforming the truck bed, since the J-hook assembly 54 attaches to existing brackets, holes or tie-down points of the truck bed. Additionally, further brackets may be installed in the truck bed at existing holes or tie-down points to facilitate the use of the J-hook assembly 54 for securing the front and rear support feet 30, 40.

Each front support foot 30 may also include an access hole 37 to provide visibility and facilitate attachment of the front support foot 30 to the truck bed using J-hook assemblies 54 extending between attachment points 34 and existing brackets, further brackets, holes or tie-down points in the truck bed. Following attachment of the front support foot 30 to the truck bed, the access hole 37 may be covered by an access hole cover 38, as shown in FIGS. 10A to 10E, for example. The access hole cover 38 may be made of high density polyethylene, other plastics, metals, or combinations thereof, for example. The access hole cover 38 may include decorative indicia 38A or other surface treatment formed by, for example, embossing, debossing, texturing (e.g., graining), engraving, printing, etc. In addition, the access hole cover may include at least one snap-in tab 38B and at least one finger access feature 38C to facilitate snapping-in and removal of the cover 38 to/from access hole 37. Moreover, the substantially square shape of the access hole 37 and access hole cover 38 may allow the cover 38 to be snapped into hole 37 in any of four orientations that are rotated 90 degrees relative to each other, thereby facilitating ease of use. Alternatively, the access hole 37 and access hole cover 38 may have shapes other than the substantially square shape shown in FIGS. 9A to 10E, for example, such as circular, polygonal or others, while still maintaining the ease of use.

Further, the front and rear support feet 30, 40 may include at least one guide channel surface 36, 46 on which a guide channel 57, as shown in FIGS. 14A to 14C, for example, may rest and/or be secured. The guide channel 57 may be made of high density polyethylene, other plastics, metals, or combinations thereof, for example. The guide channel 57 may be attached to the front and rear support feet 30, 40 by fasteners and/or adhesives, and extend in a front-to-rear direction between front and rear support feet 30, 40 provided on a same side (i.e., driver side or passenger side) of the truck storage system 1, as shown in FIG. 2, for example. The guide channel 57 may include at least one self-centering formation 58 that is configured to maintain wheels 63 provided on a drawer assembly 60 that roll within the guide channel 57 in an optimal position, e.g., both vertical position, as well as horizontal or lateral position, for smoothly opening/closing a drawer assembly 60, as shown in FIGS. 15A to 15F, for example.

The rear support foot assembly 40 may further include a wheel 47 that can be attached to either of two holes 48 provided at a rearward lower portion of the rear support foot assembly 40. That is, for a rear support foot assembly 40 provided at the rear, driver side corner of the truck storage system 1, the wheel 47 is attached to one rearmost hole 48, whereas for a rear support foot assembly 40 provided at the rear, passenger side corner (i.e., rotated 180 degrees from the rear, driver side corner position) of the truck storage system 1, the wheel 47 is attached to the other rearmost hole 48, as shown in FIG. 2, for example. The wheels 47 of the rear support foot assemblies 40 cooperate with the wheels 23 of the center support assembly 20 to facilitate sliding of the drawer assemblies 60.

The front and rear support feet 30, 40 are configured to be non-handed, such that a single front support foot 30 design can be installed in either the front, driver side corner or the front, passenger side corner rotated 180 degrees relative to each other. Similarly, a single rear support foot 40 design can be installed in either the rear, driver side corner or the rear, passenger side corner rotated 180 degrees relative to each other. For each rear support foot assembly 40, the wheel 47 must be installed in the appropriate hole 48 depending on its position within the truck bed.

FIGS. 12A to 12F show various views of a front/rear support foot cover 50 of a truck storage system 1 according to the present invention. The cover 50 may be made of high density polyethylene, other plastics, metals, or combinations thereof, for example. The cover 50 may be configured to fit snugly, e.g., by friction fit or snap fit, within openings 16 of the deck halves 10L, 10R, and to mate and/or substantially seal with upper surfaces 31, 41 of the front and rear support feet 30, 40. A finger access lip may be provided on an edge of cover 50, and a corresponding finger access recess may be provided on deck halves 10L, 10R to facilitate removal of the covers 50. An upper surface of cover 50 may include various functional and/or decorative indicia 51 or other surface treatment formed by, for example, embossing, debossing, texturing (e.g., graining), engraving, printing, etc. For example, the surface treatment of the upper surface of cover 50 may provide traction to prevent slipping and/or sliding of materials placed on the upper surface. A lower surface of cover 50 may include cup holders 52 and/or other areas 53 for the placement of cups, tools, fasteners or any other objects, when the cover 50 is removed from opening 16 or when the cover 50 is placed upside down within opening 16. All openings 16 may be configured to have the same dimensions, and thus, only a single design of cover 50 may fit in any opening 16 of the deck 10.

FIGS. 15A to 15F show various views of a drawer assembly 60 of a truck storage system 1 according to the present invention. The drawer assembly 60 may be made of high density polyethylene, other plastics, metals, or combinations thereof, for example. Each drawer assembly 60 may be rated to carry a payload of about 200 lbs, for example.

The drawer assembly 60 may include a drawer 61, integral wheel channels 62, wheels 63, wheel bracket assemblies 66, integral handle 64, lock 65 and latch assembly 70. The drawer 61 may be configured to receive materials therein, and may include notches or other formations to transversely receive drawer dividers 68, as shown in FIGS. 18A to 18D, for example, and the drawer 61 may receive a mat along its inner bottom surface. The drawer dividers 68 may include notches or other formations 69 to allow the placement of longer items within drawers 61 when using dividers 68 or to facilitate the use of ropes, cords or other items for tying down and/or securing items within the drawers 61. Alternatively, drawer dividers that extend in a front-to-rear direction of the drawer 61 may also be provided. In addition, the integral handle 64 of drawer 61 may be initially molded into the drawer 61 and facilitate opening, closing and/or grasping of the drawer assemblies 60. An integral handle may also be provided at opposite end of drawer 61 to facilitate grasping of the drawer assemblies 60, for example, when removed from the truck storage system 1. Further, the drawer 61 may be configured to allow nesting of multiple drawers 61 within each other for packaging, shipping and/or storage by appropriate design of, for example, the sidewalls, integral wheel channels 62 and integral handle 64 of the drawer 61.

The integral wheel channels 62 may receive the wheels 23 of the center support assembly 20 and the wheels 47 of the rear support foot assembly 40, and the wheels 63 may roll within integral drawer wheel channels 22 of center support assembly 20 and guide channel 57 secured to front and rear support feet 30, 40 to facilitate sliding of the drawer assemblies 60. The integral wheel channels 62 of the drawer assemblies 60, may include at least one self-centering formation 62a that is configured to maintain the drawer assemblies 60 in an optimal position, e.g., both vertical position, as well as horizontal or lateral position, for smooth opening/closing. The integral wheel channels 62 may end at a position short of the forward end of the drawer 61, such that the ends of the integral wheel channels 62 act as integral stops to prevent further opening or falling out of the drawer assemblies 60. If the user desires to remove the drawer assemblies 60, this can be effected by removing the wheels 23, 47 and then removing the drawer assemblies 60. The wheels 63 may be attached to the drawer 61 by wheel bracket assemblies 66 having wheel shafts 67, as shown in FIGS. 17A to 17D, for example. The wheel bracket assembly 66 may be a single, non-handed design that can be used for both wheels 63 of the drawer 61 by using one wheel shaft 67 in one installation position and the other wheel shaft 67 in the other installation position, while one or the other wheel shaft remains unused in each position and extends through the forward end of the drawer 61, as shown in FIGS. 15A, 15B, 15D, 17C and 17D, for example.

The lock 65 may allow locking of the drawer assembly 60 in the fully closed position. The lock 65, as shown in FIGS. 16A to 16D, for example, may include a locking cam 65a that can rotate between an open position and a closed position. In an open position, the locking cam 65a allows the drawer assembly 60 to be pulled out of the truck storage system 1. In the closed position, the locking cam 65a may cooperate with structure on the lower surface 12 of the deck halves 10L, 10R to prevent pulling out of the drawer assembly 60. For example, the locking cam 65a may engage with a reinforcement beam 19 that at least partially protrudes from the lower surface 12 of the deck halves 10L, 10R, thereby not requiring any additional structural features to be molded into the deck halves 10L, 10R to provide the locking function. Alternatively, the locking cam 65a may engage with other structure on the lower surface 12 of the deck halves 10L, 10R.

FIG. 19 shows a close-up, view of a latch assembly 70 and lock 65 of a truck storage system 1 according to the present invention. The latch assembly 70 may be made of high density polyethylene, other plastics, metals, or combinations thereof, for example.

The latch assembly 70 may include left and right arms 71, 72, a handle 73, as shown in FIGS. 20A to 22C, for example, as well as springs and pins (not shown), as would be understood by one of ordinary skill in the art. The left and right arms 71, 72 of the latch assembly 70 may include latching cams 71a, 72a that can rotate between an open position and a closed position. In an open position, the latching cams 71a, 72a allow the drawer assembly 60 to be pulled out of the truck storage system 1. In the closed position, the latching cams 71a, 72a may cooperate with structure on the lower surface 12 of the deck halves 10L, 10R to prevent pulling out of the drawer assembly 60. For example, the latching cams 71a, 72a may engage with a reinforcement beam 19 that at least partially protrudes from the lower surface 12 of the deck halves 10L, 10R, thereby not requiring any additional structural features to be molded into the deck halves 10L, 10R to provide the latching function. Alternatively, the latching cams 71a, 72a may engage with other structure on the lower surface 12 of the deck halves 10L, 10R.

The handle 73 interconnects the left and right arms 71, 72 of the latch assembly 70, and provides an ergonomical grip for a user when opening/closing the drawer assembly 60. For example, the handle 73 may, in cross-section, have a substantially rounded or semispherical shape, or a D-shape to provide a comfortable grip to a user. In addition, the surfaces of the left and right arms 71, 72 and the handle 73 may include various functional and/or decorative indicia or other surface treatment formed by, for example, embossing, debossing, texturing (e.g., graining), engraving, printing, etc. For example, the surface treatment of the handle 73 may provide grip to provide secure grasping of the handle 73. Furthermore, the latch assembly 70 may be designed to unlatch, i.e., open the latching cams 71a, 72a, upon pulling of the handle 73 toward the rear of the truck storage system 1, and the latch assembly 70 may be designed to latch, i.e., close the latching cams 71a, 72a, upon pushing of the drawer 61 toward the front of the truck storage system 1.

Figure 23:
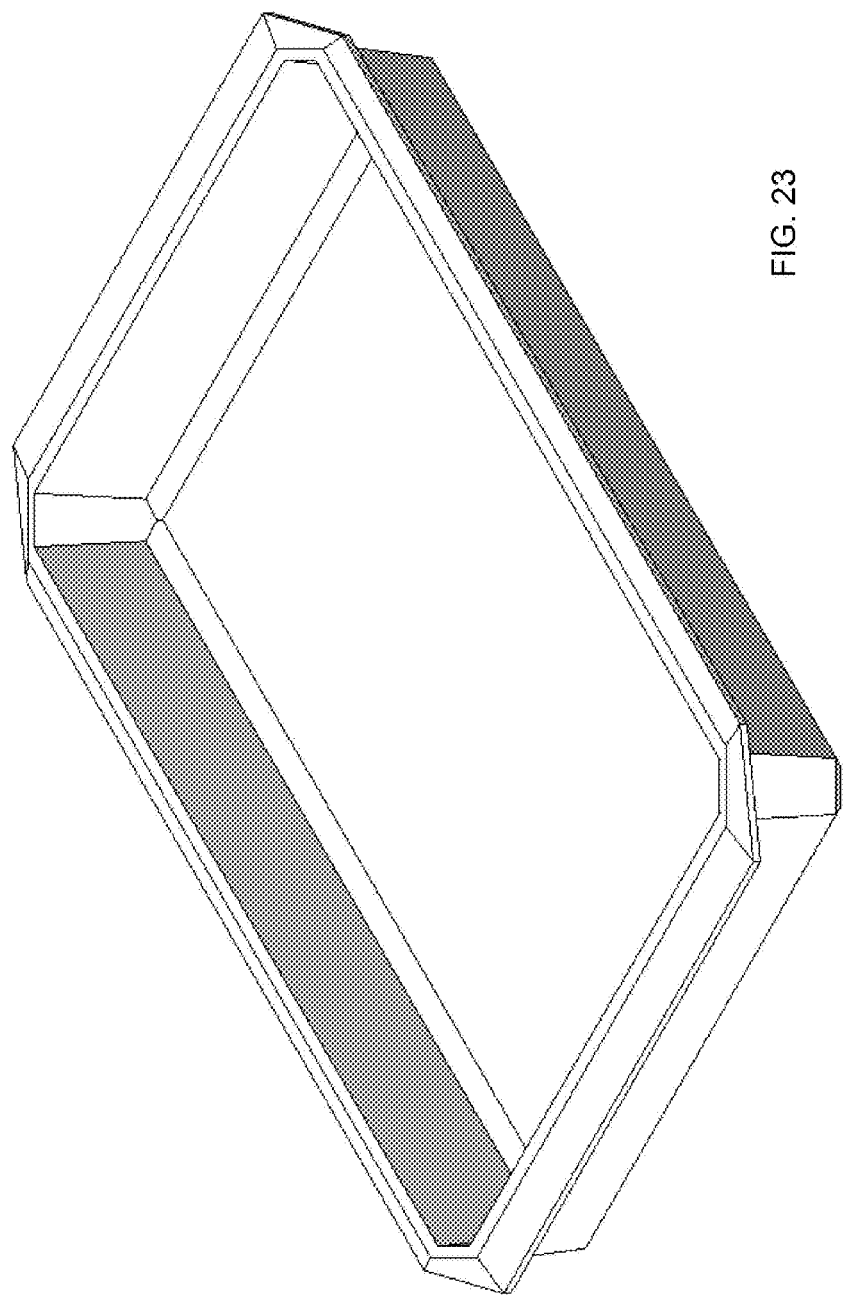
FIG. 23 shows a top perspective view of a bin tray of a truck storage system according to the present invention.
Figure 24:
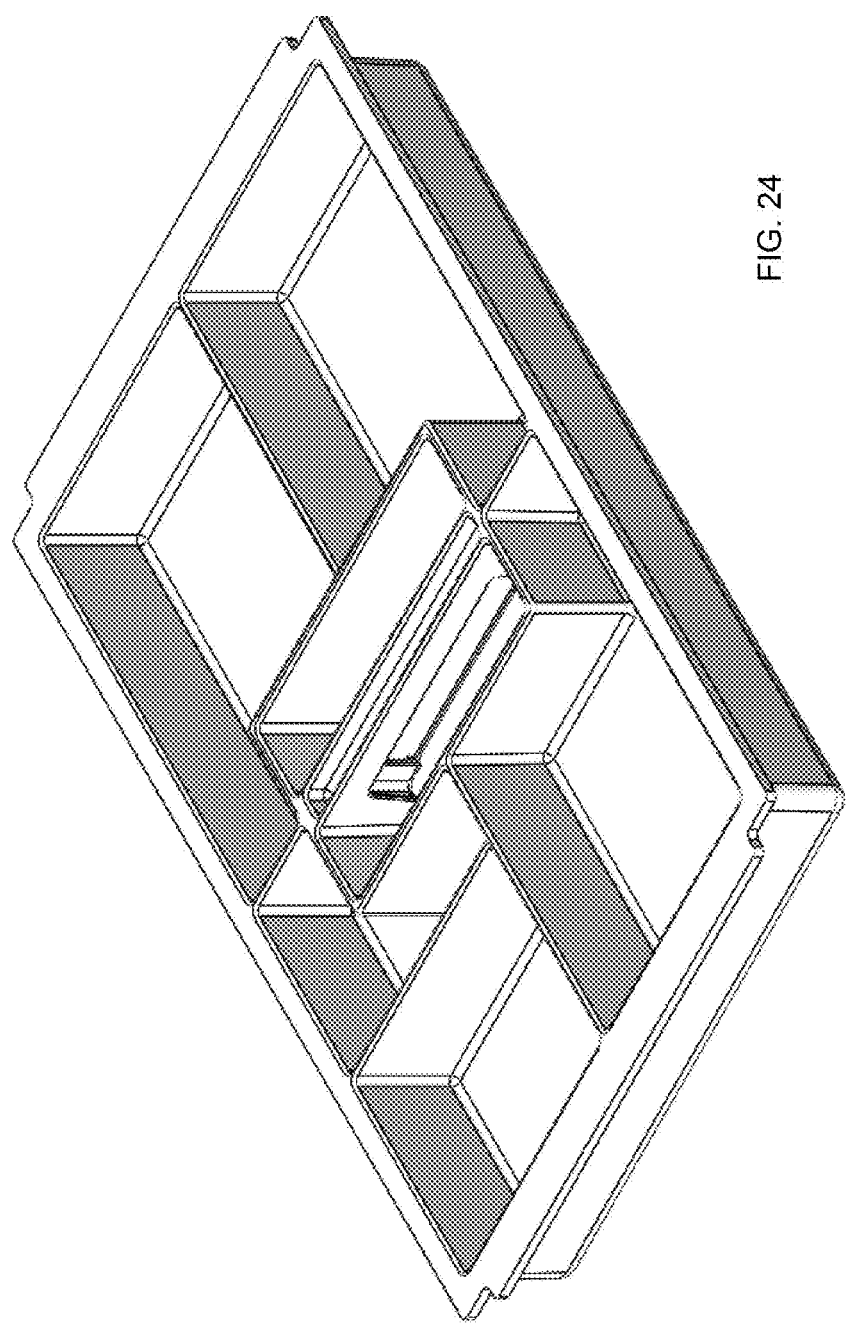
FIG. 24 shows a top perspective view of a tool tray of a truck storage system according to the present invention.

FIG. 23 shows a top perspective view of a bin tray 80, and FIG. 24 shows a top perspective view of a tool tray 81 of a truck storage system 1 according to the present invention. The trays 80, 81 may be made of high density polyethylene, other plastics, metals, or combinations thereof, for example. The trays 80, 81 may include a single compartment or multiple, variously sized compartments for holding tools, fasteners or any other items. The trays 80, 81 may be configured to rest on upper edges of the drawer assemblies 60, and may be slidable on the drawer assemblies 60. Further, the trays 80, 81 may be removable in order to facilitate transport of items held in trays 80, 81 away from truck storage system 1. The trays are also nestable for packaging, shipping and/or storage.

Figure 26:
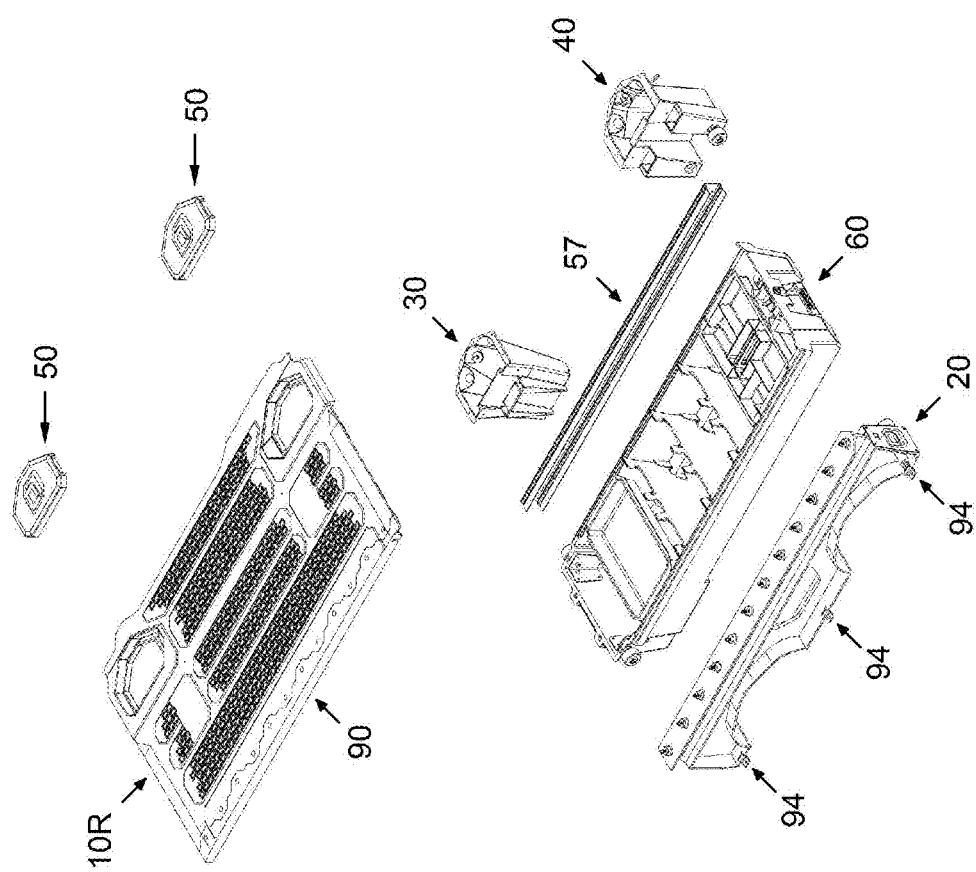
FIG. 26 shows a partially exploded view of the second exemplary embodiment of a truck storage system according to the present invention.

FIG. 25 shows a top perspective view and FIG. 26 shows a partially exploded view of a second exemplary embodiment of a truck storage system 1' according to the present invention. As shown in FIGS. 25 and 26, the truck storage system 1' may comprise a deck 10 including only one of a left deck half 10L or a right deck half 10R, a center support assembly 20, a front support foot 30, a rear support foot 40, foot support covers 50 and one drawer assembly 60, all of which are described herein. All components of the second exemplary embodiment of the truck storage system 1' may include all of the features described herein with reference to the first exemplary embodiment of the truck storage system 1.

The truck storage system 1' may be sized to fit both long and short truck beds, and may cover only approximately half the width of the truck bed. The truck storage system 1' may allow the use of an elevated deck 10 and one drawer assembly 60 covering only approximately half the width of the truck bed, while maintaining the remaining half of the width of the truck bed unaltered for, for example, loading larger and/or taller items in the truck bed.

Figure 27:
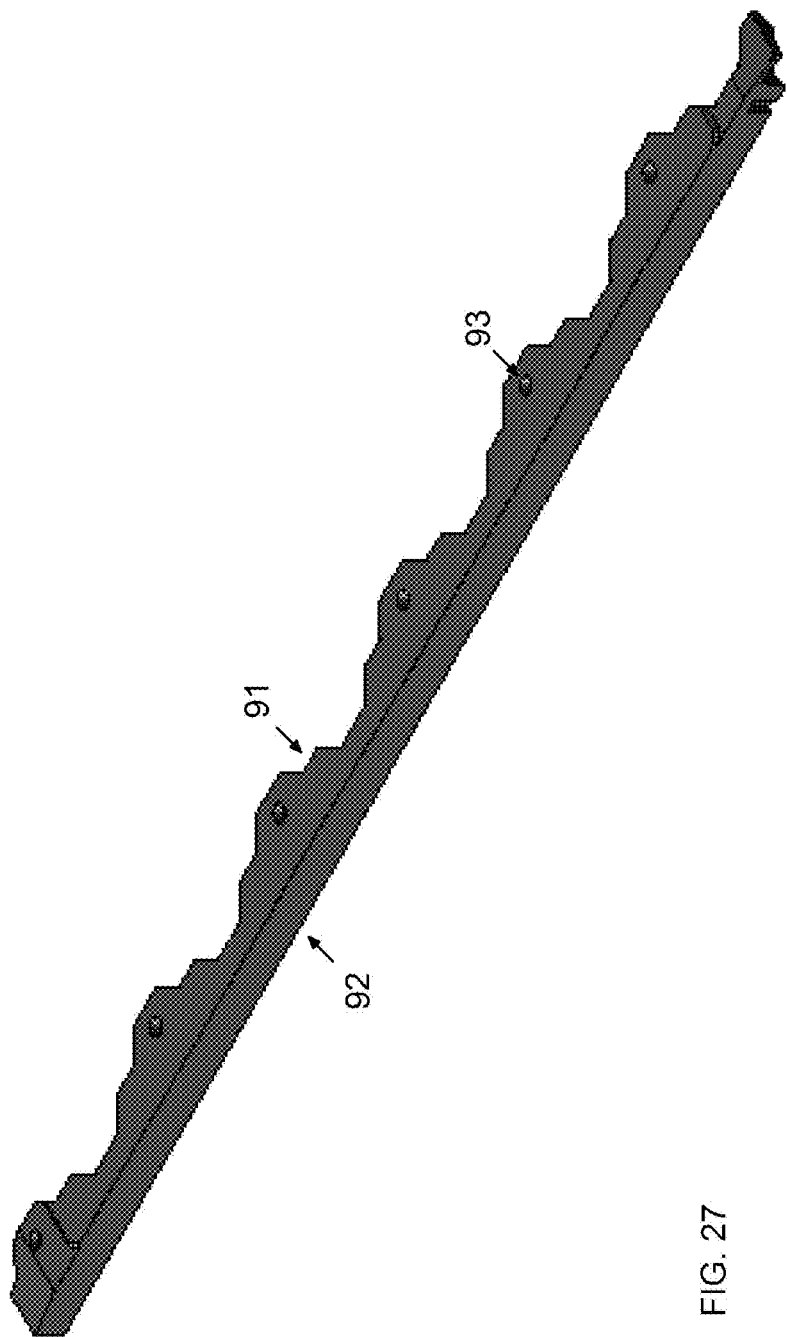
FIG. 27 shows a top perspective view of a trim piece for the second exemplary embodiment of a truck storage system according to the present invention.
Figure 28:
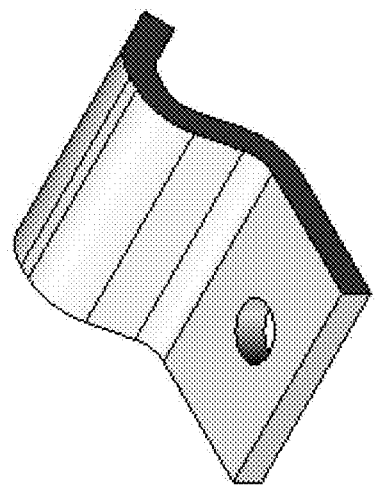
FIG. 28 shows a top perspective view of a bracket for the second exemplary embodiment of a truck storage system according to the present invention.

In addition to the components described above included in the second exemplary embodiment of the truck storage system 1', the truck storage system 1' may also include a trim piece 90 and one or more brackets 94, as shown in FIGS. 27 and 28, for example. The trim piece 90 may include an inner side edge 91, a lateral side edge 92 and holes 93. The inner side edge 91 may include a meandering profile that is identical to the meandering profile of the inner side edge 14 of the deck half 10L or 10R, and is configured such that the inner side edge 91 mates with the inner side edge 14 of the deck half 10L or 10R without gaps, thereby forming the deck 10 of the truck storage system 1'. The lateral side edge 92 may form a clean edge without any sharp corners or protrusions, and may form a smooth transition to, e.g., be flush with, the center support assembly 20.

The trim piece 90 may also include holes 93 for receiving projections 21 of the center support assembly 20. The holes 93 may be countersunk on the lower surface of the trim piece 90 in order to receive the projections 21 of the center support assembly 20. Additionally, fasteners and/or adhesives may be inserted in the holes 93 to secure the trim piece 90 to the center support assembly 20.

The brackets 94 may be used to secure the center support assembly 20 of the truck storage system 1' to the truck bed. Since, as described herein, the center support assembly 20 is not physically attached to the truck bed but is configured as a load rest, the truck storage system 1' that spans only approximately half the width of the truck bed is secured to the truck bed only via one front support foot 30 and one rear support foot assembly 40 and the corresponding J-hook assemblies 54, brackets, fasteners, adhesives, etc. Accordingly, it may be necessary to physically secure the center support assembly 20 of the truck storage system 1' to the truck bed in order to prevent any movement, e.g., lateral or vertical movement, of the truck storage system 1' during vehicle movement. One or more brackets 94 may thus be used to secure the center support assembly 20 to the truck bed via holes drilled by a user in the truck bed. Alternatively, if holes or tie-down points already exist in the truck bed in the vicinity of the brackets 94, it would be preferable to use such existing holes or tie-down points.

All components of the truck storage systems 1, 1' may be made in long and short versions that correspond to long truck bed designs of approximately 6.5 feet and short truck bed designs of approximately 5.5 feet. For example, components such as the deck halves 10L, 10R, center support assembly 20, guide channels 57, drawer assemblies 60, and trim piece 90 may be manufactured in long and short versions. Only one set of tooling may be needed for these components, in which tool inserts may be inserted/removed for manufacturing long vs. short versions. Thus, long and short variations of the truck storage systems 1, 1' may be economically manufactured with one set of tooling. Moreover, the non-handedness of many of the components of the truck storage systems 1, 1', such as for example, the deck halves 10L, 10R, front support feet 30, rear support feet assemblies 40, foot covers 50, guide channel 47, and drawer assemblies 60, may further allow for economical manufacture of the storage systems 1, 1'.

Furthermore, all components of the truck storage system 1, 1' may be designed to fit within myriad truck bed designs of truck manufacturers. For example, the truck storage system 1, 1' may be designed to accommodate seventeen of the eighteen series of full-sized pickup trucks sold in the U.S. since 2000. For example, lateral side edges 15 of the deck halves 10L, 10R may be processed to fit within any one of the myriad truck bed designs. In addition, the center support assembly 20 may be designed to rest securely within any one of the myriad truck bed designs. In this respect, truck beds generally have an undulating surface from the driver side to the passenger side of the truck bed, e.g., an alternating series of upstanding and downstanding beads. As a result, the width of the lower surface of the center support assembly 20 may be designed to rest securely on the variously designed undulating surfaces of any one of the myriad truck bed designs, e.g., on one upstanding bead, or on two upstanding beads and straddling one downstanding bead. Similarly, the front and rear support feet 30, 40 may be designed to rest securely on the variously designed undulating surfaces of any one of the myriad truck bed designs. Further, the front and rear support feet 30, 40 may be designed to interface with existing holes, brackets or tie-down points of any one of the myriad truck bed designs.

In addition, the bottom surface of the drawers 61 may be designed with a notch, a raised surface and/or a sloped surface configured to provide clearance to a lowered tailgate. Truck bed and tailgate designs of various truck manufacturers provide different angles of inclination, i.e., tailgate ramp angle, of the lowered tailgate with respect to the plane of the bottom surface of the truck bed, and the largest of the different angles of inclination is approximately 2.5 degrees. Thus, in order to provide clearance for fully opening the drawer assemblies 60, a notch, a raised surface and/or a sloped surface may be provided on the bottom surface of the drawer 61, such that a single drawer design can be used in any one of myriad truck bed designs. Accordingly, a single design of truck storage systems 1, 1' can be used by owners of any one of the myriad truck bed designs of truck manufacturers.

As a result, if an owner has installed the truck storage system 1, 1' in an old truck, but then sells the old truck and purchases a new, different truck, the owner can simply remove the existing truck storage system 1, 1' from the old truck, purchase only new deck halves 10L, 10R having lateral side edges 15 processed to fit within the new truck, and reinstall all other components of the existing truck storage system 1, 1' in the new truck with the new deck halves 10L, 10R.

All components of the truck storage systems 1, 1' may be configured to nest within each other for packaging, shipping and/or storage, for example. As described herein, the drawer assemblies 60 may nest within each other. In addition, components such as front support feet 30, rear support feet 40, foot covers 50, lock 65, drawer dividers 68, latch assembly 70, trays 80, 81, wheels, J-hook assemblies 54, fasteners, brackets, and/or adhesives, and any other small parts may be placed within nested drawer assemblies 60. The remaining components, such as the deck halves 10L, 10R, center support assembly 20, guide channels 57, and any other large parts may be packaged together with the nested drawer assemblies 60. Alternatively, the deck halves 10L, 10R may be packaged and/or shipped separately from the remaining components.

All components of the truck storage systems 1, 1' may be made of high density polyethylene, other plastics, metals, or combinations thereof, for example. Since the storage systems 1, 1' are to be installed in truck beds that are typically exposed to the environment and may encounter heavy loads and rough use, it may be advantageous to use materials that have high corrosion resistance. For example, high density polyethylene (HDPE) may be particularly advantageous for providing high strength, low weight and good corrosion resistance. Thus, the storage systems 1, 1' may have a long useful service life, and may be rated for carrying heavy loads suitable for the truck bed alone without adding excessive weight that may adversely affect the performance of the vehicle.

The long version of the truck storage system 1 (spanning substantially a total width of a truck bed) that corresponds to long truck bed designs of approximately 6.5 feet may weigh approximately 195 lbs, and the short version of the truck storage system 1 (spanning substantially a total width of a truck bed) that corresponds to short truck bed designs of approximately 5.5 feet may weigh approximately 168 lbs. Further, the long version of the truck storage system 1' (spanning approximately half a total width of a truck bed) that corresponds to long truck bed designs of approximately 6.5 feet may weigh approximately 108 lbs, and the short version of the truck storage system 1' (spanning approximately half a total width of a truck bed) that corresponds to short truck bed designs of approximately 5.5 feet may weigh approximately 93 lbs.

In addition, the truck storage system 1 (spanning substantially a total width of a truck bed) can support approximately 2000 lbs of load on its deck 10, and the truck storage system 1' (spanning approximately half a total width of a truck bed) can support approximately 1000 lbs of load on its deck 10.

Although the present invention has been described with reference to particular examples and exemplary embodiments, it should be understood that the foregoing description is in no manner limiting. Moreover, the features described herein may be used in any combination.

What is claimed is:

1. A truck storage system, comprising:
    a deck configured to span substantially a total width of a truck bed;
    four support feet, each support foot situated at a respective corner of the truck bed and configured to support the deck; and
    a center support extending in a longitudinal direction of the truck bed between the support feet and configured to support the deck,
    wherein the center support includes at least one integral guide channel configured to receive at least one wheel of a drawer assembly.

2. A truck storage system, comprising:
    a deck configured to span substantially a total width of a truck bed;
    four support feet, each support foot situated at a respective corner of the truck bed and configured to support the deck; and
    a center support extending in a longitudinal direction of the truck bed between the support feet and configured to support the deck,
    wherein the deck includes two, non-handed deck halves configured to interleave with each other above the center support.

3. The system of claim 2, wherein outer lateral edges of the deck are processable to match sidewall profiles of different sized truck beds.

4. The system of claim 2, wherein the deck includes transverse reinforcement beams configured to increase strength of the deck.

5. The system of claim 2, wherein the deck is attached to upper surfaces of the four support feet by fasteners, and to an upper surface of the center support by protrusions and corresponding countersunk holes and/or fasteners.

6. The system of claim 2, wherein the four support feet include two, non-handed front support feet and two, non-handed rear support feet.

7. The system of claim 2, wherein each support foot is attached to existing tie-down points of the truck bed via J-hooks, brackets and/or fasteners.

8. The system of claim 2, wherein each support foot is attachable to existing tie-down points of different sized truck beds.

9. The system of claim 2, wherein the center support acts as a load rest without direct attachment to the truck bed.

10. The system of claim 2, wherein the center support is configured to stably support the deck in different sized truck beds.

11. The system of claim 2, wherein the deck, the support feet, and the center support are made of high density polyethylene.

12. The system of claim 2, wherein the deck includes four openings, each opening leading to a compartment defined by an interior of each support foot.

13. The system of claim 12, further comprising non-handed covers to cover each of the four openings, an underside of each cover including cup holders, trays and/or compartments.

14. The system of claim 2, further comprising a ruler plate situated at a rearward edge of the deck and configured to act as a scuff plate.

15. The system of claim 2, further comprising:
    at least one drawer assembly situated between a) a front support foot and a rear support foot on one side, and b) the center support on an other side, the drawer assembly configured to be slidable in the longitudinal direction of the truck bed via wheels and corresponding self-centering guide channels.

16. The system of claim 15, wherein the drawer assembly includes a latch and a lock configured to interengage with a reinforcement beam on an underside of the deck.

17. The system of claim 15, wherein the drawer assembly includes a notch, a raised surface and/or a sloped surface on its rearward, lower surface configured to provide clearance to a lowered tailgate of the truck bed.

18. The system of claim 15, wherein the drawer assembly includes at least two drawer assemblies that are nestable for packaging, shipping and/or storage.

19. The system of claim 2, wherein long and short versions of the truck storage system are manufacturable using a single set of tooling and tool inserts.

20. A truck storage system, comprising:
    a deck configured to span substantially a total width of a truck bed;
    four support feet, each support foot situated at a respective corner of the truck bed and configured to support the deck;
    a center support extending in a longitudinal direction of the truck bed between the support feet and configured to support the deck; and
    at least one drawer assembly situated between a) a front support foot and a rear support foot on one side, and b) the center support on an other side, the drawer assembly configured to be slidable in the longitudinal direction of the truck bed via wheels and corresponding self-centering guide channels, wherein the center support includes an integral, inner guide channel to receive an inner front wheel of the drawer assembly, further comprising an outer guide channel extending in the longitudinal direction of the truck bed between the front support foot and the rear support foot and receiving an outer front wheel of the drawer assembly, and wherein the center support includes an inner rear wheel, the rear support foot includes an outer rear wheel, and the drawer assembly includes integral, lower guide channels to receive each of the inner and outer rear wheels.

21. A truck storage system, comprising:
a deck configured to span substantially a total width of a truck bed;
four support feet, each support foot situated at a respective corner of the truck bed and configured to support the deck;
a center support extending in a longitudinal direction of the truck bed between the support feet and configured to support the deck; and
at least one drawer assembly situated between a) a front support foot and a rear support foot on one side, and b) the center support on an other side, the drawer assembly configured to be slidable in the longitudinal direction of the truck bed via wheels and corresponding self-centering guide channels,
wherein the drawer assembly includes integral drawer stops configured to prevent falling out of the drawer assembly from the truck storage system.

22. A truck storage system, comprising:
a deck configured to span approximately half a total width of a truck bed;
two support feet on a same lateral side of the truck bed, a front support foot situated at a forward corner of the truck bed and a rear support foot situated at a rearward corner of the truck bed, the two support feet configured to support the deck; and
a center support including at least one integral guide channel, the center support extending in a longitudinal direction of the truck bed between the support feet and an opposing side of the truck bed not spanned by the deck, the center support configured to support the deck.

23. The system of claim 22, further comprising brackets configured to secure the center support to the truck bed via fasteners.

24. A truck storage system, comprising:
a deck configured to span approximately half a total width of a truck bed;
two support feet on a same lateral side of the truck bed, a front support foot situated at a forward corner of the truck bed and a rear support foot situated at a rearward corner of the truck bed, the two support feet configured to support the deck;
a center support extending in a longitudinal direction of the truck bed between the support feet and an opposing side of the truck bed not spanned by the deck, the center support configured to support the deck, and
a trim piece configured to interleave with an edge of the deck above the center support, and to attach to an upper surface of the center support by protrusions and corresponding countersunk holes and/or fasteners.

* * * * *